United States Patent
Dane et al.

(10) Patent No.: US 9,905,015 B2
(45) Date of Patent: Feb. 27, 2018

(54) SYSTEMS AND METHODS FOR NON-OBSTACLE AREA DETECTION

(71) Applicant: QUALCOMM Incorporated, San Diego, CA (US)

(72) Inventors: Gokce Dane, San Diego, CA (US); Vasudev Bhaskaran, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 15/685,390

(22) Filed: Aug. 24, 2017

(65) Prior Publication Data
US 2018/0012367 A1  Jan. 11, 2018

Related U.S. Application Data

(63) Continuation of application No. 14/858,471, filed on Sep. 18, 2015, now Pat. No. 9,761,000.

(51) Int. Cl.
*G06K 9/00* (2006.01)
*G06T 7/20* (2017.01)
(Continued)

(52) U.S. Cl.
CPC ............ *G06T 7/20* (2013.01); *G06K 9/00791* (2013.01); *G06K 9/00798* (2013.01); *G06T 7/11* (2017.01);
(Continued)

(58) Field of Classification Search
None
See application file for complete search history.

(56) References Cited

U.S. PATENT DOCUMENTS 6,813,370 B1 * 11/2004 Arai ................... G06T 7/593
340/908.1
7,346,190 B2 * 3/2008 Taniguchi .......... G06K 9/00798
340/907
(Continued)

FOREIGN PATENT DOCUMENTS

| CN | 104424660 A | 3/2015 |
| EP | 2466901 A2 | 6/2012 |
| EP | 2741233 A2 | 6/2014 |

OTHER PUBLICATIONS

P. Lombardi, M. Zanin and S. Messelodi, "Unified stereovision for ground, road, and obstacle detection," IEEE Proceedings. Intelligent Vehicles Symposium, 2005., 2005, pp. 783-788.*

(Continued)

*Primary Examiner* — Andrae A Allison
(74) *Attorney, Agent, or Firm* — Austin Rapp

(57) ABSTRACT

A method performed by an electronic device is described. The method includes generating a depth map of a scene external to a vehicle. The method also includes performing first processing in a first direction of a depth map to determine a first non-obstacle estimation of the scene. The method also includes performing second processing in a second direction of the depth map to determine a second non-obstacle estimation of the scene. The method further includes combining the first non-obstacle estimation and the second non-obstacle estimation to determine a non-obstacle map of the scene. The combining includes combining comprises selectively using a first reliability map of the first processing and/or a second reliability map of the second processing The method additionally includes navigating the vehicle using the non-obstacle map.

30 Claims, 17 Drawing Sheets

(51) Int. Cl.
  *G06T 7/50* (2017.01)
  *G06T 7/507* (2017.01)
  *G06T 7/11* (2017.01)
  *G06K 9/62* (2006.01)
(52) U.S. Cl.
  CPC ............... *G06T 7/50* (2017.01); *G06T 7/507* (2017.01); *G06K 9/6292* (2013.01); *G06T 2207/10028* (2013.01); *G06T 2207/30256* (2013.01)

(56) References Cited

U.S. PATENT DOCUMENTS

| | | | | |
|---|---|---|---|---|
| 8,548,229 B2* | 10/2013 | Badino | ............... | G06K 9/00805 382/106 |
| 8,923,605 B2* | 12/2014 | You | .................... | G06K 9/00208 382/154 |
| 2008/0267494 A1* | 10/2008 | Cohen | .................... | G06T 3/4007 382/166 |
| 2013/0163821 A1* | 6/2013 | You | .................... | G06K 9/00208 382/104 |
| 2013/0272577 A1* | 10/2013 | Sakamoto | ............... | G08G 1/167 382/103 |
| 2014/0086451 A1* | 3/2014 | Liu | .................... | G06K 9/00798 382/103 |
| 2017/0084038 A1 | 3/2017 | Dane et al. | | |

OTHER PUBLICATIONS

Gao Y., et al., "U-V-Disparity Based Obstacle Detection with 3D Camera and Steerable Filter," Intelligent Vehicles Symposium (IV), IEEE, 2011, pp. 957-962.

Inernational Search Report and Written Opinion—PCT/US2016/045042—ISA/EPO—Oct. 20, 2016.

Labayrade R., et al., "A Single Framework for Vehicle Roll, Pitch, Yaw Estimation and Obstacles Detection by Stereovision", IEEE, Proceedings of Intelligent Vehicle Symposium, Jun. 9, 2003 (Jun. 9, 2003), pp. 31-36, XP010645505, ISBN: 978-0-7803-7848-3 the whole document.

Labayrade R., et al., "Real Time Obstacle Detection in Stereovision on Non Flat Road Geometry Through V-Disparity Representation", Intelligent Vehicle Symposium, IEEE, Jun. 17-21, 2002, Piscataway, NJ, USA, vol. 2, Jun. 17, 2002 (Jun. 17, 2002), pp. 646-651, XP010635896, ISBN: 978-0-7803-7346-4 the whole document.

Lombardi P., et al., "Unified Stereovision for Ground, Road, and Obstacle Detection", Proceedings of Intelligent Vehicles Symposium, IEEE, Las Vegas, NV, USA, Jun. 6-8, 2005, Piscataway, NJ, USA, Jun. 6, 2005 (Jun. 6, 2005), pp. 783-788, XP010833892, DOI: 10.1109/IVS.2005.1505200, ISBN: 978-0-7803-8961-8 the whole document.

Oniga F., et al., "Fast Obstacle Detection Using U-Disparity Maps with Stereo Vision", International Conference on Intelligent Computer Communication and Processing (ICCP), IEEE, Sep. 3, 2015 (Sep. 3, 2015), pp. 203-207, XP032803401, DOI: 10.1109/ICCP.2015.7312630 [retrieved on Oct. 29, 2015] the whole document.

Ortigosa N., et al., "Fuzzy Free Path Detection Based on Dense Disparity Maps Obtained from Stereo Cameras," WSPC/Instruction, 2012, 16 pages.

Ortigosa N., et al., "Obstacle-Free Pathway Detection by Means of Depth Maps," Journal of Intelligent & Robotic Systems, 2011, vol. 63 (1), pp. 115-129.

Taiwan Search Report—TW105125931—TIPO—dated Dec. 8, 2017; p. 1.

* cited by examiner

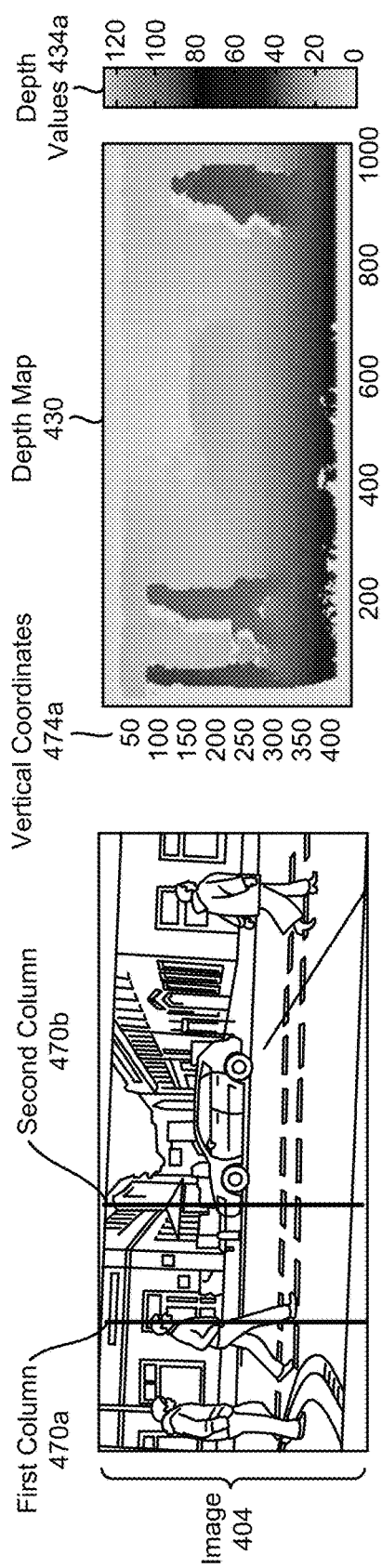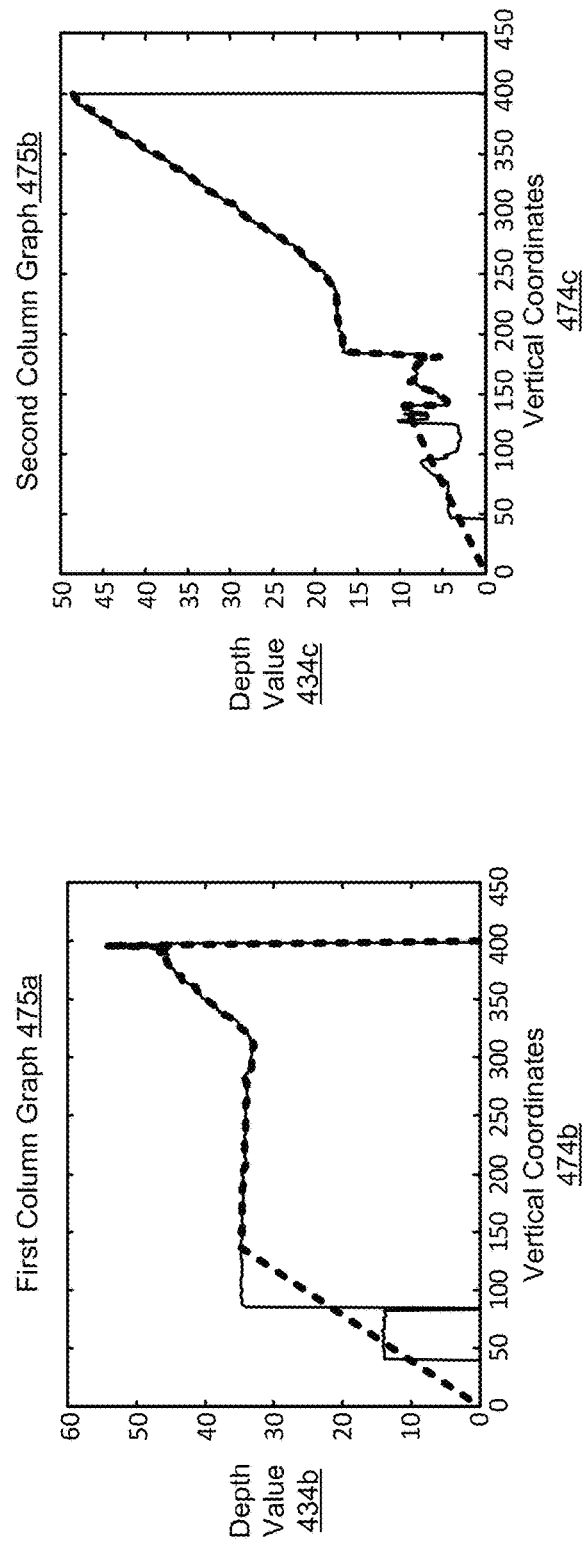
FIG. 4A
FIG. 4B
FIG. 4C
FIG. 4D

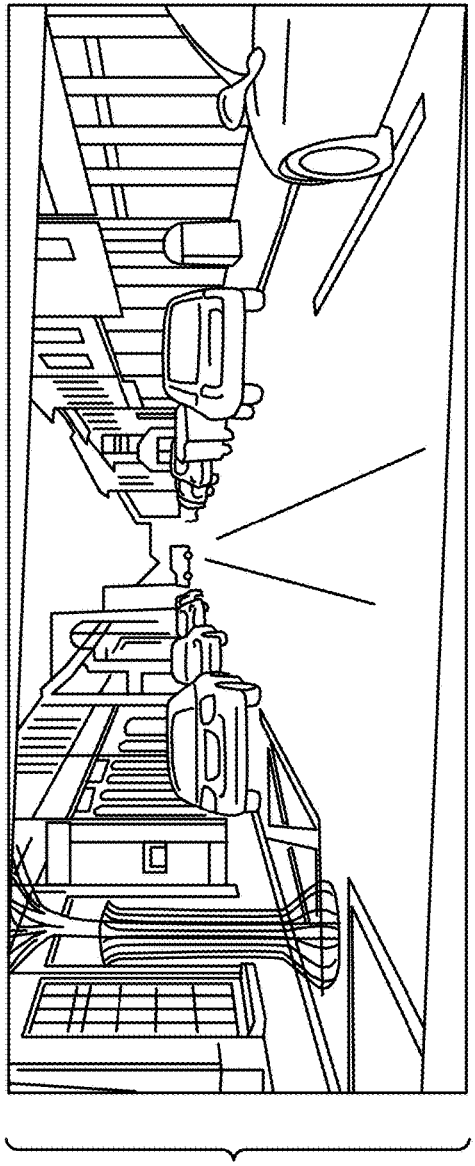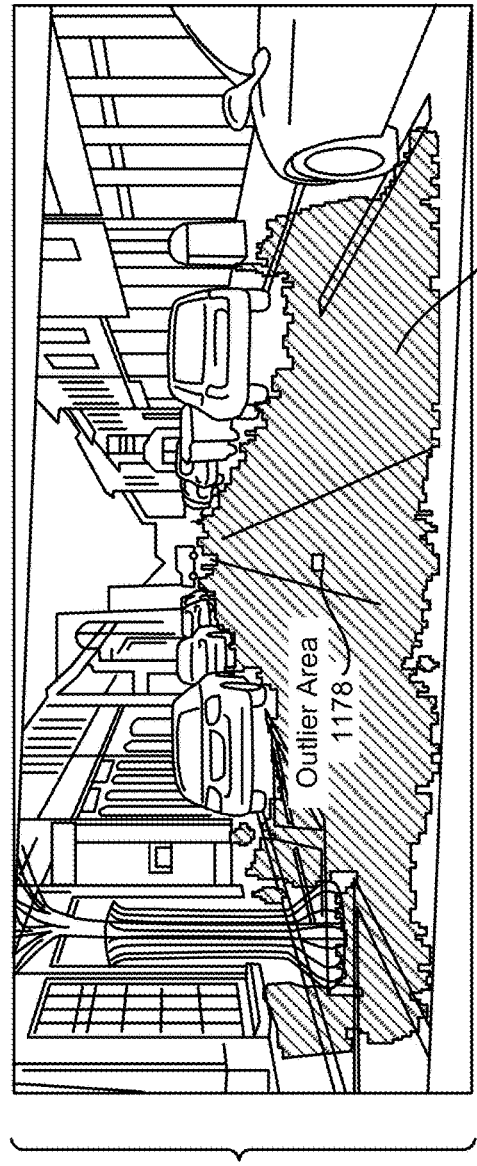
FIG. 11A — Original Image 1114a
FIG. 11B — Processed Image 1114b; 1166 Non-Obstacle Area; Outlier Area 1178

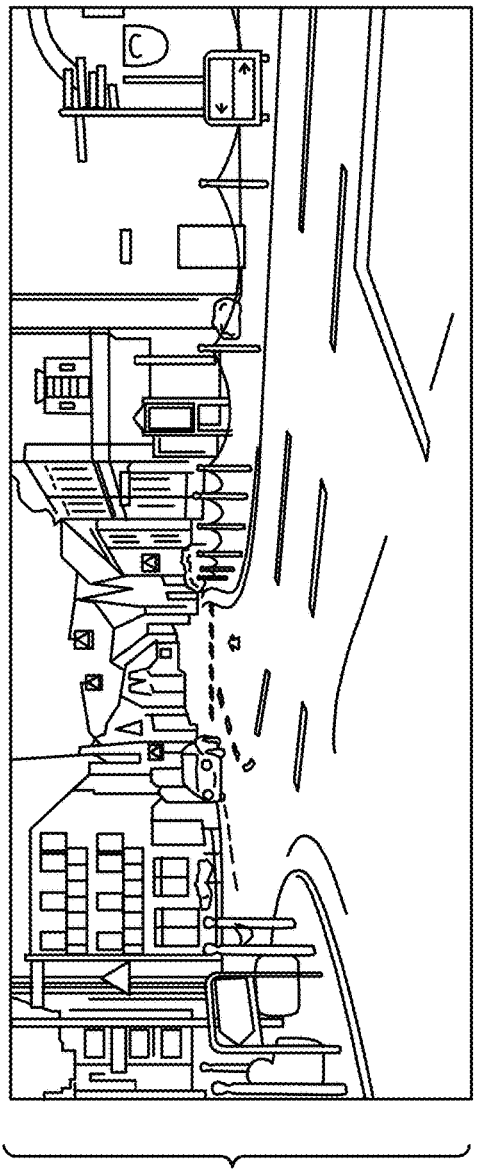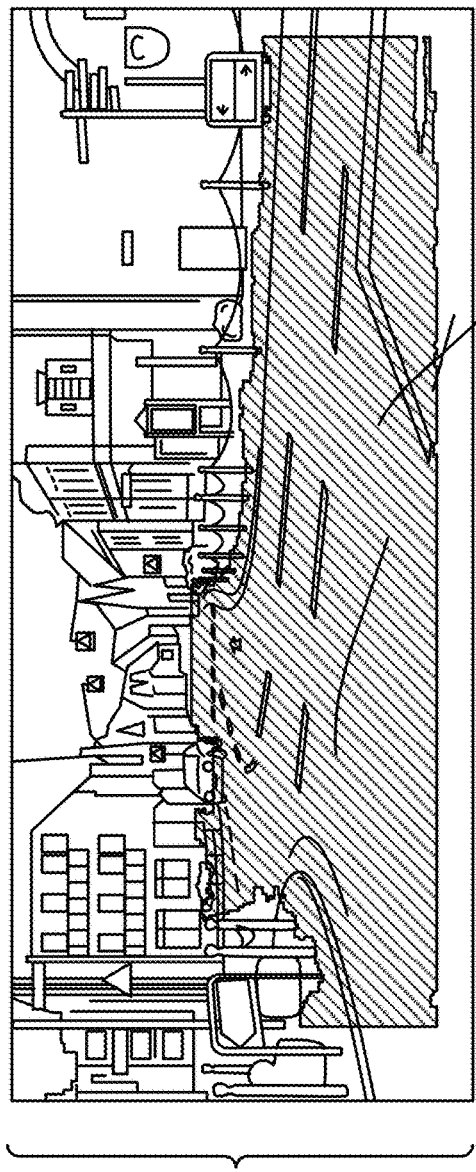

SYSTEMS AND METHODS FOR NON-OBSTACLE AREA DETECTION

RELATED APPLICATIONS

This application is a continuation of U.S. patent application Ser. No. 14/858,471, filed Sep. 18, 2015, for "SYSTEMS AND METHODS FOR NON-OBSTACLE AREA DETECTION," which is assigned to the assignee hereof and hereby expressly incorporated by reference herein.

FIELD OF DISCLOSURE

The present disclosure relates generally to electronic devices. More specifically, the present disclosure relates to systems and methods for non-obstacle area detection.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cameras, video camcorders, digital cameras, cellular phones, smart phones, computers, televisions, etc.) capture and/or utilize images. For example, a smartphone may capture and/or process still and/or video images. In automotive and autonomous vehicle applications, obstacle detection may be performed by processing an image. Processing images may demand a relatively large amount of time, memory and energy resources. The resources demanded may vary in accordance with the complexity of the processing.

It may be difficult to implement some complex processing tasks. For example, some platforms may have limited processing, memory and/or energy resources. Furthermore, some applications may be time sensitive. As can be observed from this discussion, systems and methods that improve image processing may be beneficial.

SUMMARY

A method performed by an electronic device is described. The method includes performing vertical processing of a depth map to determine a vertical non-obstacle estimation. The method also includes performing horizontal processing of the depth map to determine a horizontal non-obstacle estimation. The method further includes combining the vertical non-obstacle estimation and the horizontal non-obstacle estimation. The method additionally includes generating a non-obstacle map based on the combination of the vertical and horizontal non-obstacle estimations.

Performing vertical processing may include dividing the depth map into segments. At least one segment may include a number of pixels in a column. Linear model parameters may be estimated for at least one segment to determine the vertical non-obstacle estimation. A vertical reliability map that includes a reliability value for the vertical non-obstacle estimation may be generated.

Determining the vertical reliability map may include determining a segment fitting error for a given segment based on a difference between the estimated linear model parameters and pre-determined linear model parameters. A reliability value for the given segment may be determined by comparing the segment fitting error to a vertical estimation threshold. The reliability value for the given segment may be applied to at least one pixel in the given segment.

The pre-determined linear model parameters may be selected from among a plurality of road condition models. The plurality of road condition models may have a corresponding set of linear model parameters.

Performing horizontal processing may include obtaining a depth histogram for at least one row of pixels of the depth map. A terrain line may be determined from the depth histogram. A horizontal non-obstacle estimation may be determined based on a distance of a depth value of at least one pixel from the terrain line. A horizontal reliability map may be generated that includes a reliability value for the horizontal non-obstacle estimation.

Generating the horizontal reliability map may include determining whether the depth value of a given pixel is within a range of a mode of the depth histogram. The given pixel may have a high reliability value when the depth value of the given pixel is within the range of the mode of the depth histogram.

Combining the vertical non-obstacle estimation and the horizontal non-obstacle estimation may include performing both the vertical processing and the horizontal processing in parallel. The vertical non-obstacle estimation and the horizontal non-obstacle estimation may be merged based on a vertical reliability map and a horizontal reliability map.

A given pixel may be identified as a non-obstacle area in the non-obstacle map where both the vertical reliability map and the horizontal reliability map are characterized by a high reliability value for the given pixel. A given pixel may be identified as an obstacle area in the non-obstacle map where at least one of the vertical reliability map or the horizontal reliability map are characterized by a low reliability value for the given pixel. A given pixel may be identified as a non-obstacle area or obstacle area in the non-obstacle map based on a coordinate of the given pixel where the vertical reliability map and the horizontal reliability map are characterized by different reliability values for the given pixel.

Combining the vertical non-obstacle estimation and the horizontal non-obstacle estimation may include performing vertical processing of the depth map. A vertical reliability map may be obtained based on a model fitting confidence. Reliable regions of the vertical reliability map may be identified as non-obstacle areas. Horizontal processing may be performed on unreliable regions of the vertical reliability map to determine whether the unreliable regions are non-obstacle areas.

Combining the vertical non-obstacle estimation and the horizontal non-obstacle estimation may include performing horizontal processing of the depth map. A horizontal reliability map may be obtained based on a depth histogram distance. Reliable regions of the horizontal reliability map may be identified as non-obstacle areas. Vertical processing on unreliable regions of the horizontal reliability map may be performed to determine whether the unreliable regions are non-obstacle areas.

The non-obstacle map may be used in identifying a region of interest used by at least one of an object detection algorithm or a lane detection algorithm.

An electronic device is also described. The electronic device is configured to perform vertical processing of a depth map to determine a vertical non-obstacle estimation. The electronic device is also configured to perform horizontal processing of the depth map to determine a horizontal non-obstacle estimation. The electronic device is further configured to combine the vertical non-obstacle estimation and the horizontal non-obstacle estimation. The electronic device is additionally configured to generate a non-obstacle map based on the combination of the vertical and horizontal non-obstacle estimations.

An apparatus is also described. The apparatus includes means for performing vertical processing of a depth map to determine a vertical non-obstacle estimation. The apparatus also includes means for performing horizontal processing of the depth map to determine a horizontal non-obstacle estimation. The apparatus further includes means for combining the vertical non-obstacle estimation and the horizontal non-obstacle estimation. The apparatus additionally includes means for generating a non-obstacle map based on the combination of the vertical and horizontal non-obstacle estimations.

A computer-program product is also described. The computer-program product includes a non-transitory tangible computer-readable medium having instructions thereon. The instructions include code for causing an electronic device to perform vertical processing of a depth map to determine a vertical non-obstacle estimation. The instructions also include code for causing the electronic device to perform horizontal processing of the depth map to determine a horizontal non-obstacle estimation. The instructions further include code for causing the electronic device to combine the vertical non-obstacle estimation and the horizontal non-obstacle estimation. The instructions additionally include code for causing the electronic device to generate a non-obstacle map based on the combination of the vertical and horizontal non-obstacle estimations.

BRIEF DESCRIPTION OF THE DRAWINGS

FIGS. 4A-4D illustrate an example of a vertical processing of a depth map;

FIGS. 11A-11B illustrate an example of determining non-obstacle areas in an image;

FIGS. 12A-12B illustrate another example of determining non-obstacle areas in an image;

DETAILED DESCRIPTION

In many applications, it is advantageous to identify non-object areas within a region or environment for obstacle avoidance. For example, with advanced driver assistance systems (ADAS), it is important to identify the drivable area in front of the car for obstacle avoidance. Another scenario in which obstacle avoidance is important is vehicular automation in which an autonomous vehicle (e.g., an unmanned aerial vehicle (UAV) or autonomous automobile) senses its environment and navigates without human input.

Typically the problem of obstacle avoidance is looked at from the other direction, where objects of interest (e.g., pedestrians, cars, bicycles) are detected and may be identified via object detection/recognition algorithms and alerts are provided to the driver for taking precaution. For example, obstacle detection may be utilized to detect and identify traffic signs (e.g., speed limit signs, stop signs, street signs, etc.). However, this approach may be slow and inaccurate. Furthermore all the object classes have to be trained beforehand, which makes it difficult to ad din new object classes.

In the systems and methods described herein, instead of identifying objects, regions are identified that are free of obstacles or objects. These regions may be referred to as moveable areas. In other words, these three dimensional regions are non-obstacle areas in which movement is possible. For example, a non-obstacle area may be identified on a road. Upon identifying non-obstacle areas, various other applications such as road profiling, speed control, faster and more reliable object, and lane detection may be performed using the non-obstacle area.

The systems and methods described herein may be used to identify a non-obstacle area by analyzing a depth map. In an implementation, the depth map may be generated from a stereo image pair. In a road scenario, open space in the front may be mapped to a linear model that describes the road in the depth domain. By using the depth of road segments, linear model parameters may be estimated. The estimated linear model parameters may be compared with prior (e.g., pre-determined) model parameters. If fitting is achieved, then the segments are declared to be part of the open area. If a stereo image pair is not available, methods such as structure from motion can be used to obtain a depth map by using a mono camera input sequence.

The systems and methods described herein provide for the determination of a non-obstacle map based on an intelligent combination of vertical processing and horizontal processing of one or more images. Systems and methods of performing identifying a non-obstacle area are explained in greater detail below.

Figure 1:
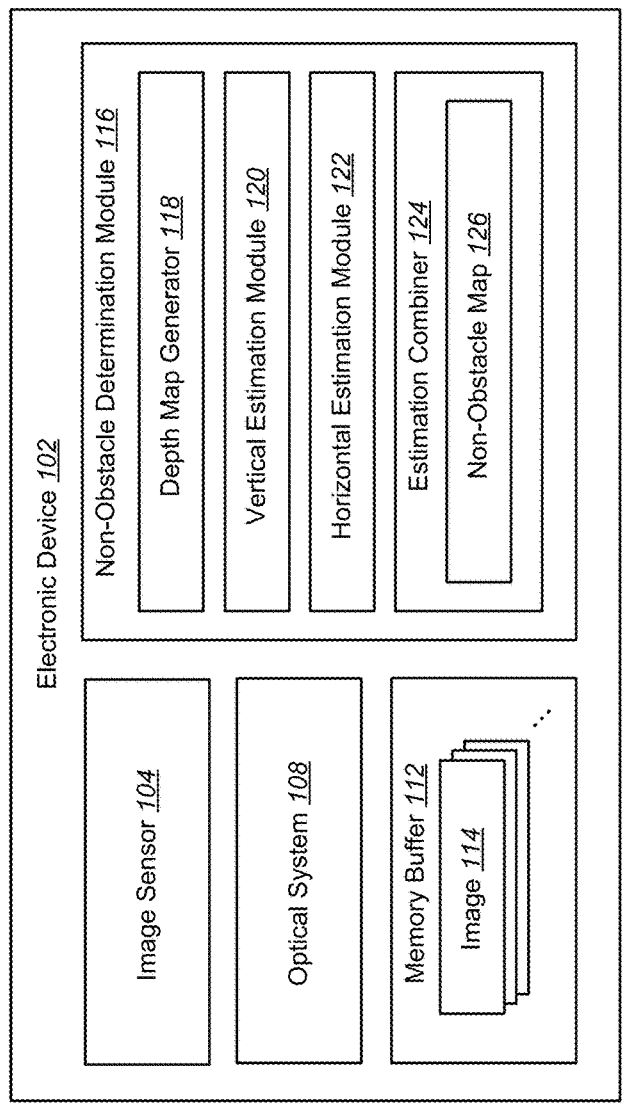
FIG. 1 is a block diagram illustrating an electronic device configured to perform non-obstacle area detection.

FIG. 1 is a block diagram illustrating an electronic device 102 configured to perform non-obstacle area detection. The electronic device 102 may also be referred to as a wireless communication device, a mobile device, mobile station, subscriber station, client, client station, user equipment (UE), remote station, access terminal, mobile terminal, terminal, user terminal, subscriber unit, etc. Examples of electronic devices include laptop or desktop computers, cellular phones, smart phones, wireless modems, e-readers, tablet devices, gaming systems, robots, aircraft, unmanned aerial vehicles (UAVs), automobiles, etc. Some of these devices may operate in accordance with one or more industry standards.

In many scenarios, the electronic device 102 may use a non-obstacle map 126 of a scene. In one example, a smartphone may generate a non-obstacle map 126 of a scene to identify unoccupied space. In another example, an automobile may include an advanced driver assistance system (ADAS) that may use a non-obstacle map 126 to regulate speed, steering, parking, etc., of the automobile based on detected traffic signs, signals and/or other objects. In another example, an unmanned aerial vehicle (UAV) may generate a non-obstacle map 126 from video recorded while in flight, may navigate based on detected objects (e.g., buildings, signs, people, packages, etc.), may pick up and/or deliver a detected package, etc. Many other examples may be implemented in accordance with the systems and methods disclosed herein. For instance, the systems and method disclosed herein could be implemented in a robot that performs one or more actions (e.g., fetching something, assembling something, searching for an item, etc.) based on one or more objects detected using the non-obstacle map 126.

An electronic device 102 may include one or more cameras. A camera may include an image sensor 104 and an optical system 108 (e.g., lenses) that focuses images of objects that are located within the field of view of the optical system 108 onto the image sensor 104. An electronic device 102 may also include a camera software application and a display screen. When the camera application is running, images 114 of objects that are located within the field of view of the optical system 108 may be recorded by the image sensor 104. These images 114 may be stored in a memory buffer 112. In some implementations, the camera may be separate from the electronic device 102 and the electronic device 102 may receive image data from one or more cameras external to the electronic device 102.

Although the present systems and methods are described in terms of captured images 114, the techniques discussed herein may be used on any digital image. Therefore, the terms video frame and digital image may be used interchangeably herein.

In many applications, it is beneficial for an electronic device 102 to identify areas that are free of obstacles. For example, in the case of ADAS, it is important to identify the drivable area in front of the car for obstacle avoidance. In some approaches, this problem is looked at from the other direction. In these approaches, objects of interest (e.g., pedestrians, cars, bicycles) are identified via object detection and recognition algorithms and alerts are provided to the driver for taking precaution.

Other approaches may determine non-obstacle areas by performing one of either vertical processing or horizontal processing of an image 114. Each of the vertical processing and horizontal processing may estimate non-obstacle areas in an image 114. However, each approach has limitations when performed independently.

Horizontal processing may give an incorrect non-obstacle estimation when a road is slanted. Vertical processing may perform segmentation on the image 114. If the segments are large, then fitting is more reliable. However parts of objects could be included as non-obstacle (i.e., non-obstacle) areas as well. For example, using vertical processing, the bottom and top of cars or pedestrians may be incorrectly identified as a non-obstacle area. Also, sidewalks could be incorrectly identified as a non-obstacle area with the vertical processing approach. However, if segments are small, an inaccurate detection of non-obstacle area may occur.

The systems and methods described herein provide for the determination of a non-obstacle map 126 based on an intelligent combination of vertical processing and horizontal processing of one or more images 114. In the described systems and methods, instead of identifying objects, a non-obstacle map 126 may be determined by combining vertical processing and horizontal processing of a depth map. In one implementation, the depth map may be obtained from one or more images. In another implementation, the depth map may be obtained from a depth data acquisition process (e.g., LIDAR).

In an implementation, the electronic device 102 may include a non-obstacle determination module 116 for determining a non-obstacle map 126. The non-obstacle determination module 116 may include a depth map generator 118 for obtaining a depth map. The non-obstacle determination module 116 may also include a vertical estimation module 120 for performing vertical processing of the depth map to determine a vertical non-obstacle estimation. The non-obstacle determination module 116 may further include a horizontal estimation module 122 for performing horizontal processing of the depth map to determine a horizontal non-obstacle estimation.

An estimation combiner 124 may combine the vertical non-obstacle estimation and the horizontal non-obstacle estimation to determine a non-obstacle map 126. In an implementation, the estimation combiner 124 may intelligently combine the vertical non-obstacle estimation and the horizontal non-obstacle estimation based on reliability values associated with the estimations. The non-obstacle map 126 may indicate which areas of the one or more images 114 are non-obstacle areas and which areas are obstacle areas. More detail on generating the non-obstacle map 126 is given in connection with FIG. 2.

In an example, the non-obstacle map 126 may include non-obstacle areas that are free of obstacles (e.g., objects) on the roads. By combining the vertical processing and horizontal processing of an image 114, false detections may be eliminated. Furthermore, a combined approach may provide a more reliable non-obstacle estimation.

The described systems and methods may be used to speed up various other applications. For example, the electronic device 102 may use the non-obstacle map 126 for other applications such as object detection, scene understanding, road profiling, and lane detection. The described systems and methods may also solve the problem of road curb detection that current lane detection algorithms cannot handle. The described systems and methods may further help in autonomous driving, where the speed is adjusted based on the terrain of the road.

Figure 2:
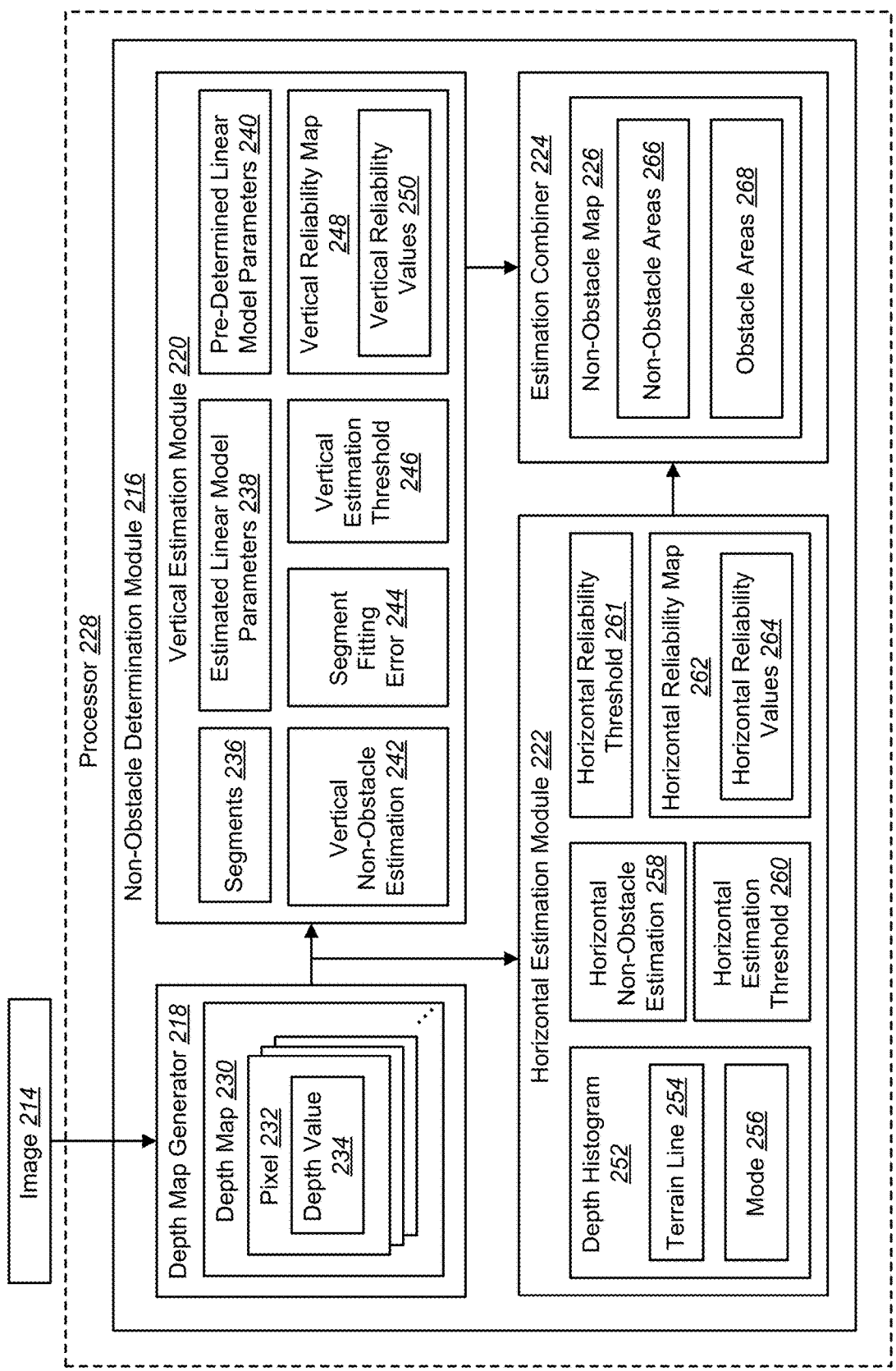
FIG. 2 is a block diagram illustrating a non-obstacle determination module.

FIG. 2 is a block diagram illustrating a non-obstacle determination module 216. The non-obstacle determination module 216 may be implemented within an electronic or wireless device. The non-obstacle determination module 216 may include a depth map generator 218, a vertical estimation module 220, a horizontal estimation module 222 and an estimation combiner 224. The non-obstacle determination module 216, depth map generator 218, a vertical estimation module 220, a horizontal estimation module 222 and an estimation combiner 224 may be configurations of the non-obstacle determination module 116, depth map generator 118, a vertical estimation module 120, a horizontal estimation module 122 and an estimation combiner 124 described above in connection with FIG. 1.

The depth map generator 218 may receive one or more images 214. In a configuration, the one or more images 214 may be obtained via a camera (e.g., an image sensor 104 and optical system 108), as described in connection with FIG. 1. In an implementation, the depth map generator 218 may receive a stereo image pair. In another implementation, the one or more images 214 may come from a video mono image. The image 214 may be a digital image made up of pixels.

The depth map generator 218 may obtain a depth map 230 from the one or more images 214. The depth map 230 may include pixels 232 corresponding to the pixels of the one or more images 214. Each pixel 232 in the depth map 230 has a depth value 234. The depth value 234 indicates a distance of the pixel 232 relative to the camera. For example, a pixel 232 with a higher depth value 234 may indicate a closer proximity to the camera than a pixel 232 with a lower depth value 234. An example of a depth map 230 is discussed in connection with FIGS. 4A-4D.

It should be noted that the algorithm described herein does not require a depth value 234 for each pixel 232. For example, the depth map 230 may have holes. The depth value 234 of these holes may be filled in before starting processing.

In the case of a stereo image pair, the depth map generator 218 may find the correspondence between pixels 232 to estimate a disparity. From the disparity, the depth map generator 218 may determine the depth value 234 for each pixel 232. Alternatively, with a video mono image, the depth map generator 218 may determine the depth value 234 for each pixel 232 based on the motion of the video.

The depth map 230 may be provided to the vertical estimation module 220 and the horizontal estimation module 222. The vertical estimation module 220 may perform vertical processing of the depth map 230 to determine a vertical non-obstacle estimation 242. The horizontal estimation module 222 may perform horizontal processing of the depth map 230 to determine a horizontal non-obstacle estimation 258.

The vertical estimation module 220 may divide the depth map 230 into segments 236. Each segment 236 may include a number of pixels 232 in a column of the depth map 230. In other words, the vertical estimation module 220 may process vertical segments 236 of the depth map 230. A segment 236 may be a portion of a column of pixels 232 in the depth map 230. For example, the segment 236 may be a vector of 10-15 pixels 232. The segments 236 may or may not overlap.

The vertical estimation module 220 may estimate linear model parameters for each segment 236 to determine the vertical non-obstacle estimation 242. Each segment 236 in the vertical direction may be estimated via a linear model. The linear model may be expressed as $$y = p_1 x + p_2, \quad (1)$$

where y is the depth value 234 of a pixel 232, x is the coordinate of the pixel 232, and $p_1$ and $p_2$ are the estimated linear model parameters 238. If the estimation error is less than a vertical estimation threshold 246 and the linear fit has a certain slope, it may be labelled as valid free space (a non-obstacle area 266). In an implementation, a slope greater than 0 indicates non-obstacle, whereas a slope that is less than or equal to 0 indicates an object or obstacle. An example of this approach is discussed in connection with FIGS. 4A-4D.

In matrix form, the linear model of Equation (1) is given by Equation (2).

$$\begin{bmatrix} y_1 \\ y_2 \\ y_3 \\ \vdots \\ y_n \end{bmatrix} = \begin{bmatrix} x_1^1 \\ x_2^1 \\ x_3^1 \\ \vdots \\ x_n^1 \end{bmatrix} \times \begin{bmatrix} p_1 \\ p_2 \end{bmatrix} \quad (2)$$

In Equation (2), y is an n-by-1 vector of depth values 234, x is the n-by-2 design matrix (i.e., a matrix of n rows, 2 columns) for the model coordinates in the vertical dimension, and $p_1$ and $p_2$ are the estimated linear model parameters 238. The value of n corresponds to the number of pixels 232 in the depth map segment 236.

In one approach, $p_1$ and $p_2$ may be solved using a least-squares solution. In this approach, p is a vector of the unknown coefficients $p_1$, and $p_2$. The normal equations are given by $$(X^T X) p = X^T y \quad (3)$$

where $X^T$ is the transpose of the design matrix X. Solving for p in Equation (4) results in the estimated linear model parameters 238 (i.e., $p_1$ and $p_2$).

$$p = (X^T X)^{-1} X^T y \quad (4)$$

It should be noted that in an optimized implementation, the matrix inversion term $(X^T X)^{-1} X^T$ is fixed based on the location (i.e., the y-coordinate) and could be pre-calculated based on location and stored. Also, a piecewise linear model could estimate dips and bumps in a surface, with variation in $p_1$, $p_2$ and segment length. Furthermore, the primary complexity of this approach is due to matrix multiplication of two vectors of size n in the above Equation (2). In an example, n may be 10 or the chosen piecewise length instead of 10.

The vertical estimation module 220 may determine a vertical reliability map 248 a reliability value 250 for the vertical non-obstacle estimation 242. In an implementation, the vertical estimation module 220 may determine a segment fitting error 244 for each segment 236 based on the difference between the estimated linear model parameters 238 and pre-determined linear model parameters 240. The predetermined model parameters may be referred to as [pM1, pM2]. The vertical estimation module 220 may check how close the predetermined model parameters are to the estimated parameters [$p_1$, $p_2$] by comparing to a threshold (TH1). For example, |$p_1$−pM1|<TH1.

The vertical estimation threshold 246 may determine if the estimated linear model parameters 238 fit into the trained model parameters. The pre-determined linear model parameters 240 may be selected from among a plurality of road condition models. Each of the plurality of road condition models may have a corresponding set of linear model parameters 240. Examples of the road condition models include a flat plane, hill, valley, etc. The pre-determined linear model parameters 240 may be determined by training.

The vertical estimation module 220 may determine an estimated depth value ($\hat{y}_i$) using the estimated linear model parameters 238 according to Equation (5), where $\hat{y}_i$ is the estimated depth value at the ith location.

$$\hat{y}_i = p_1 x_i + p_2 \quad (5)$$

A depth estimation error ($e_i$) with the estimated linear model parameters 238 may be determined according to Equation (6), where $y_i$ is the depth value 234 at the ith location.

$$e_i = y_i - \hat{y}_i \quad (6)$$

The segment fitting error 244 ($s^2$) may be determined according to Equation (7), where n is the length of the segment 236.

$$s^2 = \sum_{i=1}^{n} \frac{e_i^2}{n-2} \quad (7)$$

The segment fitting error 244 may be used as a reliability metric for vertical processing. The vertical estimation module 220 may determine the vertical reliability value 250 for each segment 236 by comparing the segment fitting error 244 of each segment 236 to a vertical estimation threshold 246.

The vertical estimation threshold 246 may be based on the pre-determined linear model parameters 240. The vertical estimation threshold 246 may vary depending on which pre-determined linear model parameters 240 are used. For example, the vertical estimation threshold 246 may have one value if pre-determined linear model parameters 240 for a flat road are used. The vertical estimation threshold 246 may have a different value if pre-determined linear model parameters 240 for a hill are used.

The vertical estimation module 220 may check the absolute value of the difference between the segment fitting error 244 and the vertical estimation threshold 246. A given segment 236 may have a high vertical reliability value 250 when the segment fitting error 244 for the given segment 236 is less than the vertical estimation threshold 246. Conversely, the given segment 236 may have a low vertical reliability value 250 when the segment fitting error 244 for the given segment 236 is greater than or equal to the vertical estimation threshold 246. Therefore, if the difference between the segment fitting error 244 and the vertical estimation threshold 246 is small, then the segment 236 is considered as part of a non-obstacle area 266. If the difference is large, then the segment 236 is not considered as part of a non-obstacle area 266.

Upon determining the reliability value 250 for a given segment 236, the vertical estimation module 220 may threshold the vertical reliability map 248 to get a binary map. The reliability value 250 for a given segment 236 may be compared with a threshold to determine whether the segment 236 is a non-object area (e.g., movable) or an object area (e.g., non-moveable area). The vertical reliability map 248 may include the reliability values 250 of the pixels 232 in the depth map 230. Therefore, the vertical reliability map 248 is a map that has a fitting confidence per depth pixel 232 as well as per segment 236.

The horizontal estimation module 222 may perform horizontal processing of the depth map 230 to determine a horizontal non-obstacle estimation 258. The horizontal processing may include obtaining a depth histogram 252 for each row of pixels 232 of the depth map 230. An example of the depth histogram 252 is described in connection with FIGS. 6A-6D. The depth histogram 252 may also be referred to as a disparity histogram.

In an implementation, the depth histogram 252 may be obtained by obtaining a histogram for each row in the depth map 230. For example, for a row of pixels 232 from the depth map 230, a histogram may be generated for the depth values 234 corresponding to the pixels 232 in the row.

The horizontal estimation module 222 may determine a terrain line 254 from the depth histogram 252. The y-coordinate of the end points of the terrain line 254 determine the closest and farthest free space distance.

The terrain line 254 may be determined using a line extraction approach. A Hough transform may be applied on the depth histogram 252. The Hough transform may extract multiple line segments from the depth histogram 252. For example, the Hough transform may generate 10-20 small lines. The line segments may be merged to form the terrain line 254. In an implementation, the angle of the terrain line 254 may be limited (e.g., between −20 degrees and −40 degrees) based on slope characteristics of non-obstacle space.

The horizontal estimation module 222 may determine the horizontal non-obstacle estimation 258 for each pixel 232 based on the distance of the depth value 234 of each pixel 232 from the terrain line 254. A pixel 232 that has a depth value 234 that lies within a horizontal estimation threshold 260 of the terrain line 254 may be identified as a non-obstacle area 266. For example, if the depth value 234 of a pixel 232 lies within a certain disparity range of the terrain line 254, then that pixel 232 may be labeled as a non-obstacle area 266. If the depth value 234 of a pixel 232 lies outside the certain disparity range of the terrain line 254, then that pixel 232 may be labeled as an obstacle area 268.

The horizontal estimation module 222 may also determine a horizontal reliability map 262 based on a depth histogram 252 distance. The horizontal reliability map 262 may include a reliability value 264 for the horizontal non-obstacle estimation 258 of each pixel 232.

The distance to the mode 256 of the depth histogram 252 may be used as a reliability metric for the horizontal processing. The horizontal estimation module 222 may determine whether the depth value 234 of each pixel 232 is within a reliability threshold 261 of the mode 256 of the depth histogram 252. A given pixel 232 may have a high reliability value 264 when the depth value 234 of the given pixel 232 is within the reliability threshold 261 of the mode 256 of the depth histogram 252.

The estimation combiner 224 may combine the vertical non-obstacle estimation 242 and the horizontal non-obstacle estimation 258 to determine the non-obstacle map 226. This combination may be based on the vertical reliability values 250 and the horizontal reliability values 264. In one approach, the vertical processing and horizontal processing may be performed in parallel and the resulting non-obstacle estimations 242, 258 merged. In another approach, the vertical processing and horizontal processing may be performed sequentially and the resulting non-obstacle estimations merged.

For the parallel processing approach, both the vertical processing and the horizontal processing may be performed in parallel. For example, the vertical estimation module 220 may perform vertical processing and the horizontal estimation module 222 may simultaneously perform horizontal processing as described above. The estimation combiner 224 may generate the non-obstacle map 226 by identifying each pixel 232 as a non-obstacle area 266 or obstacle area 268.

This identification may be based on the vertical reliability values 250 of the vertical reliability map 248 and the horizontal reliability values 264 of the horizontal reliability map 262.

If both the vertical reliability map 248 and the horizontal reliability map 262 indicate that a pixel 232 has a high reliability, then the pixel 232 may be identified as a non-obstacle area 266 in the non-obstacle map 226. In other words, a given pixel 232 may be identified as a non-obstacle area 266 in the non-obstacle map 226 where both the vertical reliability map 248 and the horizontal reliability map 262 are characterized by a high reliability value for the given pixel 232.

In an implementation, this may be achieved by thresholding the vertical reliability map 248 and the horizontal reliability map 262 with a respective threshold. For example, if a vertical reliability value 250 and a horizontal reliability value 264 of a given pixel 232 are greater than a threshold, then the pixel 232 may be identified as a non-obstacle area 266. In the case of both the vertical reliability map 248 and the horizontal reliability map 262 indicating low reliability, the pixel 232 may be labeled as an obstacle area 268.

For the case where either of the vertical reliability map 248 or the horizontal reliability map 262 indicates a high reliability and the other indicates a low reliability, one or more different merging approaches may be performed. In one approach, if at least one of the vertical reliability map 248 or the horizontal reliability map 262 indicates that the given pixel 232 has a low reliability, then the given pixel 232 is identified as an obstacle area 268 in the non-obstacle map 226. In other words, a given pixel 232 may be identified as an obstacle area 268 in the non-obstacle map 226 where at least one of the vertical reliability map 248 or the horizontal reliability map 262 are characterized by a low reliability value for the given pixel 232. In this approach, if one of the reliability maps 248, 262 is indicating low reliability, the pixel 232 may be labeled based only on that reliability map 248, 262.

In another approach, the vertical reliability map 248 and the horizontal reliability map 262 are characterized by different reliability values 250, 264 for a given pixel 232. In this case, the given pixel 232 may be identified as a non-obstacle area 266 or obstacle area 268 based on the coordinate of the given pixel 232. In this approach, if both reliability maps 248, 262 are close to each other in terms of reliability (e.g., one being higher than other), the decision can be further enhanced by considering the pixel 232 coordinates.

In an example, RHij is the horizontal reliability value 264 for ith and jth pixel 232 from horizontal processing, and RVij is the vertical reliability value 250 from vertical processing (where both reliability values 250, 264 are normalized if obtained by different methods). If |RHij−RVij|<TH, then this will indicate closeness of reliability maps 248, 262. Furthermore, RHij could be compared to RVi+n,j+n, where n is <N (for e.g. N=5 for 720p resolution).

For the sequential processing approach, either vertical processing or horizontal processing may be performed first. After the first processing is performed, the reliability map (e.g., either the vertical reliability map 248 or the horizontal reliability map 262) may be calculated for whole depth map 230. For pixels 232 where reliability is not met, a second processing is called. The results of the first and second processing may be merged to obtain the non-obstacle map 226. An example of sequential processing starting with vertical processing is described in connection with FIG. 9.

An example of sequential processing starting with horizontal processing is described in connection with FIG. 10.

The non-obstacle determination module 216 may perform additional processing of the non-obstacle map 226. In an implementation, the non-obstacle determination module 216 may perform outlier removal. For example, a small number of pixels 232 may be incorrectly labeled obstacle area 268 within a non-obstacle area 266. The non-obstacle determination module 216 may identify these outliers and change their status to either non-obstacle of obstacle. The non-obstacle determination module 216 may perform additional filtering of the non-obstacle map 226 to prepare it for subsequent operations.

The non-obstacle map 226 may be used for different operations. In one implementation, the non-obstacle map 226 may be used to identify a region of interest used by an object detection algorithm. This may be accomplished as described in connection with FIG. 14. In another implementation, the non-obstacle map 226 may be used to identify a region of interest used by a lane detection algorithm. This may be accomplished as described in connection with FIG. 15.

As illustrated in FIG. 2, one or more of the illustrated components may be optionally implemented by a processor 228. For example, the non-obstacle determination module 216 may be implemented by a processor 228. In some configurations, different processors may be used to implement different components (e.g., one processor may implement the depth map generator 218, another processor may be used to implement the vertical estimation module 220, another processor may be used to implement the horizontal estimation module 222 and yet another processor may be used to implement the estimation combiner 224).

It should be noted that it is possible that to rotate the image 214 and perform diagonal processing. If an image 214 is rotated, the vertical and horizontal processing may become diagonal processing. Therefore, while the terms vertical and horizontal processing are used herein, it may be recognized that processing could be applied across a different section through the rotated image with corresponding coordinate mapping.

Figure 3:
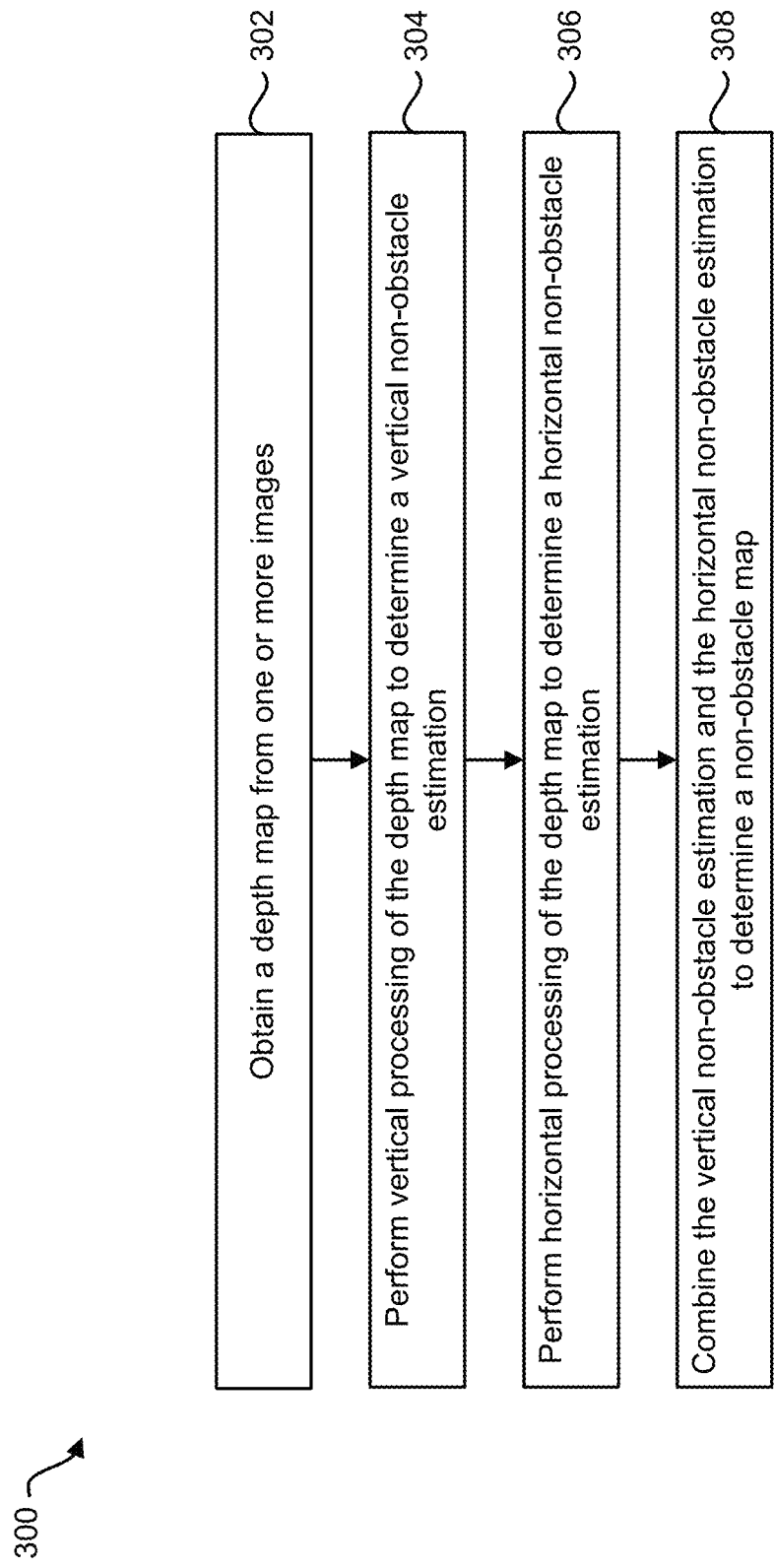
FIG. 3 is a flow diagram illustrating a method for performing non-obstacle area detection.

FIG. 3 is a flow diagram illustrating a method 300 for performing non-obstacle area detection. The method 300 may be implemented by, with reference to FIG. 1, an electronic device 102, e.g., a non-obstacle determination module 116. The electronic device 102 may obtain 302 a depth map 230 from one or more images 214. In one implementation, the electronic device 102 may generate the depth map 230 from a stereo image pair. In another implementation, the electronic device 102 may generate the depth map 230 from a video mono image. Each pixel 232 in the depth map 230 may have a depth value 234.

The electronic device 102 may perform 304 vertical processing of the depth map 230 to determine a vertical non-obstacle estimation 242. The vertical processing may include dividing the depth map 230 into segments 236. Each segment 236 may include a number of pixels 232 in a column. The electronic device 102 may estimate linear model parameters 238 for each segment 236 to determine the vertical non-obstacle estimation 242. The electronic device 102 may determine a vertical reliability map 248 that includes a reliability value 250 for the vertical non-obstacle estimation 242.

The electronic device 102 may perform 306 horizontal processing of the depth map 230 to determine a horizontal non-obstacle estimation 258. The horizontal processing may include obtaining a depth histogram 252 for each row of pixels 232 of the depth map 230. The electronic device 102 may determine a terrain line 254 from the depth histogram 252. The electronic device 102 may determine the horizontal non-obstacle estimation 258 for each pixel 232 based on the distance of the depth value 234 of each pixel 232 from the terrain line 254. The electronic device 102 may also determine a horizontal reliability map 262 that includes a reliability value 264 for the horizontal non-obstacle estimation 258 of each pixel 232.

The electronic device 102 may combine 308 the vertical non-obstacle estimation 242 and the horizontal non-obstacle estimation 258 to determine a non-obstacle map 226. In one implementation, the electronic device 102 may perform parallel vertical processing and horizontal processing. In this implementation, the electronic device 102 may combine the vertical non-obstacle estimation 242 and the horizontal non-obstacle estimation 258, as described in connection with FIG. 10. In another implementation, the electronic device 102 may perform sequential processing starting with vertical processing, as described in connection with FIGS. 11A-11B. In yet another implementation, the electronic device 102 may perform sequential processing starting with horizontal processing, as described in connection with FIGS. 12A-12B.

FIGS. 4A-4D illustrate an example of a vertical processing of a depth map 430. The depth map 430 may be generated from one or more images 404. The depth map 430 may include locations corresponding to the pixels of the original image(s) 404. Each location (e.g., coordinate) in the depth map 430 may have a horizontal coordinate 472 and a vertical coordinate 474a corresponding to the pixels of the original image(s) 404.

The depth map 430 may match the size of the original image 404 if the depth is calculated from the original resolution. In the visualization of a depth map 430, the depth value 434 may be obtained from the corresponding coordinates of the original image 404. It should be noted that a visualization of the depth map 430 may or may not be generated when generating a non-obstacle map 226.

Each pixel 232 of the depth map 430 may have a depth value 434. In this example, the depth values 434a may range from 0 to 120, where 0 indicates the farthest distance and 120 indicates the nearest distance. It should be noted that different values may be used for the depth values 434.

In an implementation, the disparity to depth mapping can be explained by the following equations. Z=fB/d, where Z is the distance along the camera Z axis, f is the focal length (in pixels), B is the baseline (in meters), d is the disparity (in pixels). When the disparity is small, the depth is large. The depth can be found in terms of meters.

It should be noted that depth estimation algorithms from stereo images 404 may not be completely reliable. For example, a depth estimation algorithm might not be able to assign depth values 434 in certain regions. A depth filling algorithm may be used to fill in the missing depth values 434. For example the neighboring depth value 434 may be propagated to an adjoining area. The propagation may be from left or from right. Alternatively, missing depth values 434 may be filled by interpolating between left and right, as well as top and bottom.

This example shows a first column 470a and a second column 470b. In a first column graph 475a, the depth values 434b are shown for the pixels 232 in the first column 470a. In this first column graph 475a, the depth values 434b are plotted verses the vertical coordinates 474b of the pixels 232 from the first column 470a. It should be noted that in this example, the zero values from 0 to 40 and after 400 pixels is because there is no depth assigned there. Because stereo images may be calibrated, they may not have the matching field of view (FOV) after calibration. Depth estimation may only be performed only within same FOV.

In a second column graph 475b, the depth values 434c are shown for the pixels 232 in the second column 470b. In this second column graph 475b, the depth values 434c are plotted verses the vertical coordinates 474c of the pixels 232 from the second column 470b. The dashed line from 0 to 150 is the mapping showing the algorithm result. The mapping may only be to sloped (i.e., slanted) lines (which specify a non-object road area). To map to objects (which are flat lines), then the same algorithm may be used, but the mapping parameters may be changed.

The solid line in the graphs 475a,b comes from original depth values. The dashed line is generated according to the described systems and methods. It should be noted that the mapping may be based on the slope of the dashed line. In these graphs 475a,b, a slope greater than 0 indicates a non-obstacle area 266. A slope less than or equal to 0 indicates an obstacle area 268.

During vertical processing, the electronic device 102 may divide the depth map 430 into segments 236. Each segment 236 may include a number of pixels 232 in a column 470. For example, the segment 236 may be a vector of 10-15 pixels 232. The electronic device 102 may determine a vertical non-obstacle estimation 242 and may estimate linear model parameters 238 as described in connection with FIG. 2. If the estimation error is less than a threshold 246 and the linear fit has a certain slope, then the segment 236 may be labelled as a valid non-obstacle area 266.

Figure 5:
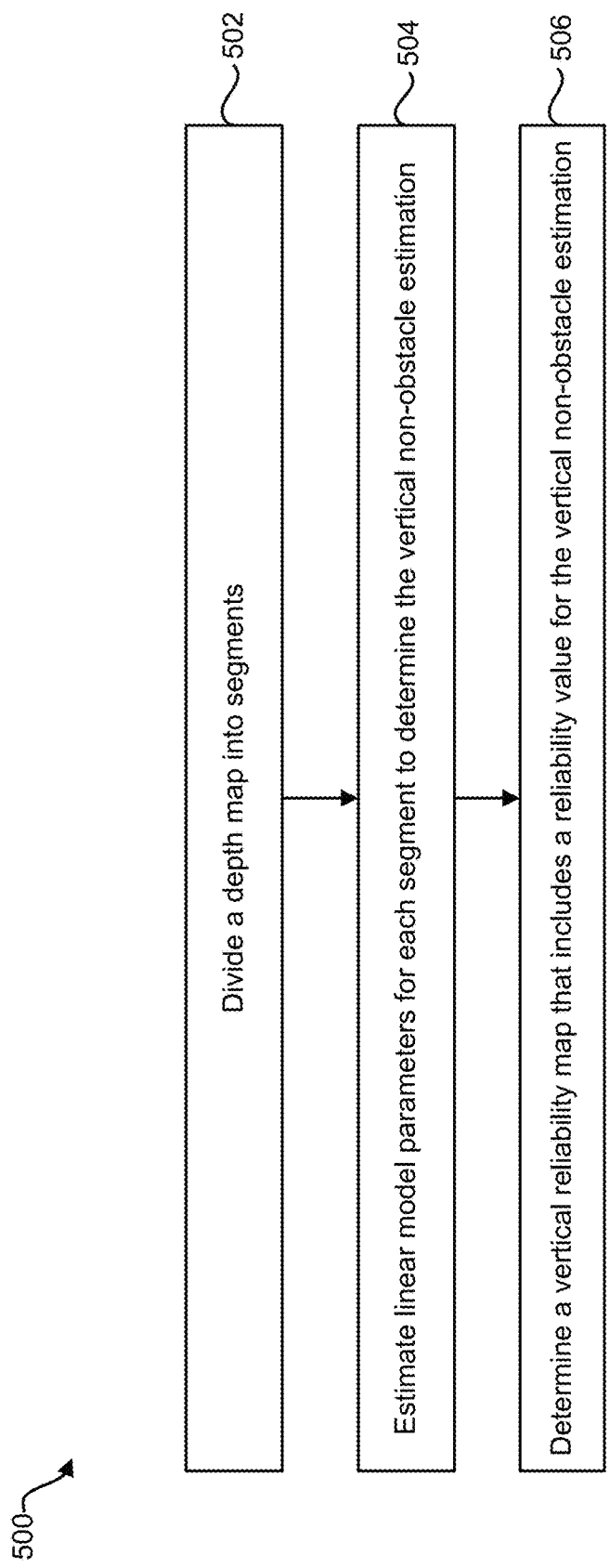
FIG. 5 is a flow diagram illustrating a method for performing non-obstacle area detection using vertical processing.

FIG. 5 is a flow diagram illustrating a method 500 for performing non-obstacle area detection using vertical processing. The method 500 may be implemented by an electronic device 102, e.g., a non-obstacle determination module 116. The electronic device 102 may divide 502 a depth map 430 into segments 236. Each segment 236 may include a number n of pixels 232 in a column 470. In an implementation, n may equal 10 pixels 232.

The electronic device 102 may estimate 504 linear model parameters 238 for each segment 236 to determine the vertical non-obstacle estimation 242. This may be accomplished according to Equations 1-4 described above.

The electronic device 102 may determine 506 a vertical reliability map 248 that includes a reliability value 250 for the vertical non-obstacle estimation 242. For example, the electronic device 102 may determine a segment fitting error 244 for each segment 236 based on the difference between the estimated linear model parameters 238 and pre-determined linear model parameters 240. The segment fitting error 244 may be determined according to Equations 5-7 above. The pre-determined linear model parameters 240 may be selected from among a plurality of road condition models (e.g., flat, hill, valley). Each of the plurality of road condition models may have a corresponding set of linear model parameters 240.

The electronic device 102 may determine the reliability value 250 for each segment 236 by comparing the segment fitting error 244 of each segment 236 to a vertical estimation threshold 246. A given segment 236 may have a high reliability value 250 when the segment fitting error 244 for the given segment 236 is less than the vertical estimation threshold 246.

The electronic device 102 may apply the reliability value 250 for a given segment 236 to each pixel 232 in the given segment 236. Therefore, each pixel 232 in the vertical reliability map 248 may have a reliability value 250 indicating confidence in the vertical non-obstacle estimation 242.

Figure 6B:
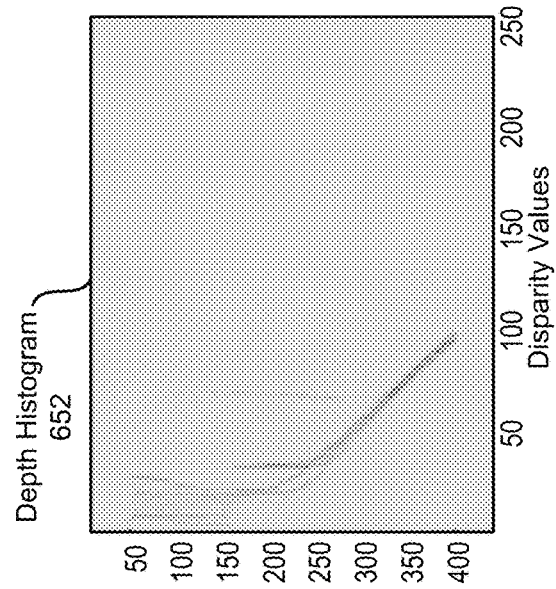
FIGS. 6A-6D illustrate an example of a horizontal processing of a depth map.
Figure 6D:
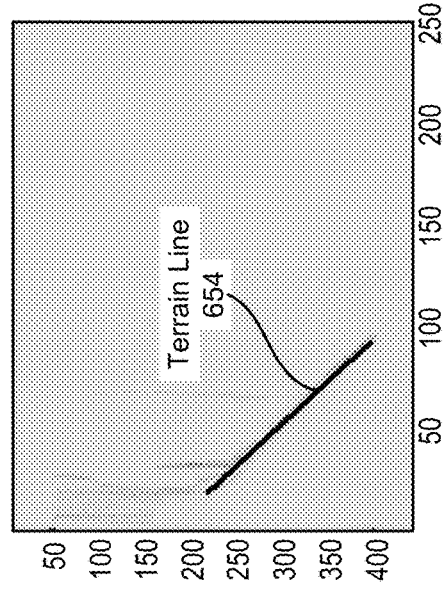
Figure 6A:
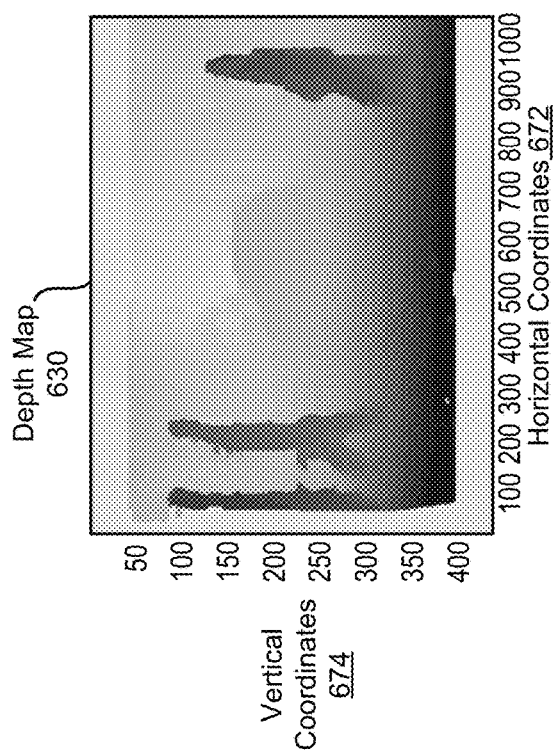
Figure 6C:
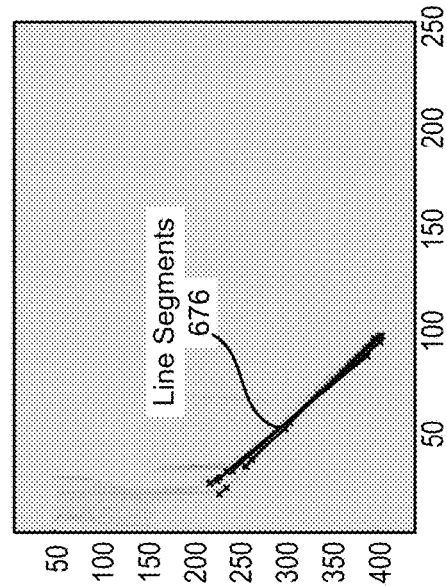

FIGS. 6A-6D illustrate an example of a horizontal processing of a depth map 630. The depth map 630 may be generated from one or more images 114. The depth map 630 illustrated in FIG. 6A is the same depth map 430 described in connection with FIG. 4B (compressed to fit the page). The depth map 630 may include locations corresponding to the pixels of the original image(s) 114. Each location in the depth map 630 may have a horizontal coordinate 672 and a vertical coordinate 674 corresponding to the pixels 232 of the original image(s) 114.

The electronic device 102 may generate a depth histogram 652. The depth histogram 652 may be generated by obtaining a histogram of depths for each row in the depth map 630. For example, the depth histogram 652 may be generated by projecting the depth map 630 in the vertical axis.

A depth histogram 652 may be calculated for each row in an image 114. The number of bins in the depth histogram 652 corresponds to the number of maximum disparity values in the image 114. For example, it could be 150 for a 720p image, or it could be larger for a larger resolution image and smaller for a smaller resolution image. The x axis in the right side of FIG. 6B corresponds to disparity values, and the intensity value in the image 114 corresponds to the histogram count for that disparity value. The darker the shade it is, the higher the disparity value, the lighter the shade it is, the lower the disparity value of histogram. In this example, a maximum number of disparity bins is 150. In the depth histogram 652, disparity values are plotted versus the vertical coordinates 674.

The electronic device 102 may apply a Hough transform on the depth histogram 652 to extract line segments 676. The Hough transform may extract multiple line segments 676 from the depth histogram 252. For example, the Hough transform may generate 10-20 small line segments 676.

The line segments 676 may be merged to form the terrain line 654. The x-coordinate of the end points of the terrain line 254 determine the closest and farthest free space distance. In an implementation, the angle of the terrain line 254 may be limited (e.g., between –20 degrees and –40 degrees) as non-obstacle space has certain slope characteristics.

If the depth histogram 652 gives a line with a negative slope, it corresponds to a road segment in front of the car without any obstacles. An obstacle will be represented by a straight vertical line at 90 degrees. The terrain line 254 indicates that the depth values in front of the camera are slowly decreasing as the depth values are analyzed in rows of an image 114. If there is an object, then the object will have same depth value for a certain number of rows. In this case, depth values will not be decreasing. The slope (i.e., angle of the terrain line 254) may be chosen according to the maximum slope a road can have.

The electronic device 102 may label the pixels 232 with depth values 634 that lie within a horizontal estimation threshold 260 of the terrain line 654 as non-obstacle areas 266. Those pixels 232 with depth values 634 that lie outside the horizontal estimation threshold 260 of the terrain line 654 may be labeled as obstacle areas 268.

Figure 7:
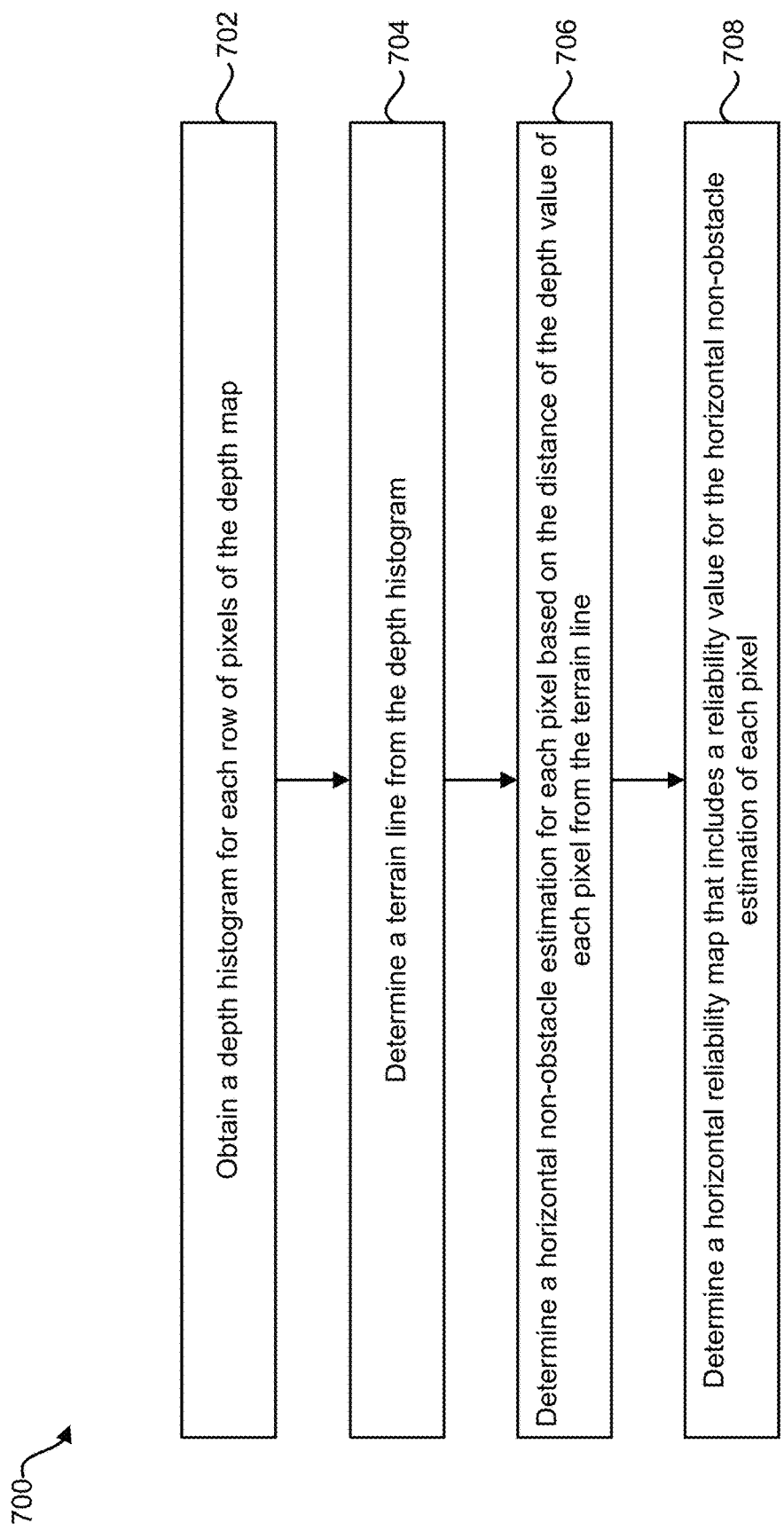
FIG. 7 is a flow diagram illustrating a method for performing non-obstacle area detection using horizontal processing.

FIG. 7 is a flow diagram illustrating a method 700 for performing non-obstacle area detection using horizontal processing. The method 700 may be implemented by an electronic device 102, e.g., a non-obstacle determination module 116. The electronic device 102 may obtain 702 a depth histogram 252 for each row of pixels 232 of the depth map 230. This may be accomplished as described in connection with FIGS. 6A-6D.

The electronic device 102 may determine 704 a terrain line 254 from the depth histogram 252. This may be accomplished as described in connection with FIGS. 6A-6D.

The electronic device 102 may determine 706 a horizontal non-obstacle estimation 258 for each pixel 232 based on the distance of the depth value 234 of each pixel 232 from the terrain line 254. Those pixels 232 with depth values 634 that lie within a horizontal estimation threshold 260 of the terrain line 654 may be labeled as non-obstacle areas 266. Those pixels 232 with depth values 634 that lie outside the horizontal estimation threshold 260 of the terrain line 654 may be labeled as obstacle areas 268.

The electronic device 102 may determine 708 a horizontal reliability map 262 that includes a reliability value 264 for the horizontal non-obstacle estimation 258 of each pixel 232. For example, the distance to the mode 256 of the depth histogram 252 may be used as a reliability metric for the horizontal processing. The electronic device 102 may determine whether the depth value 234 of each pixel 232 is within a reliability threshold 261 of the mode 256 of the depth histogram 252. A given pixel 232 may have a high reliability value 264 when the depth value 234 of the given pixel 232 is within the reliability threshold 261 of the mode 256 of the depth histogram 252.

Figure 8:
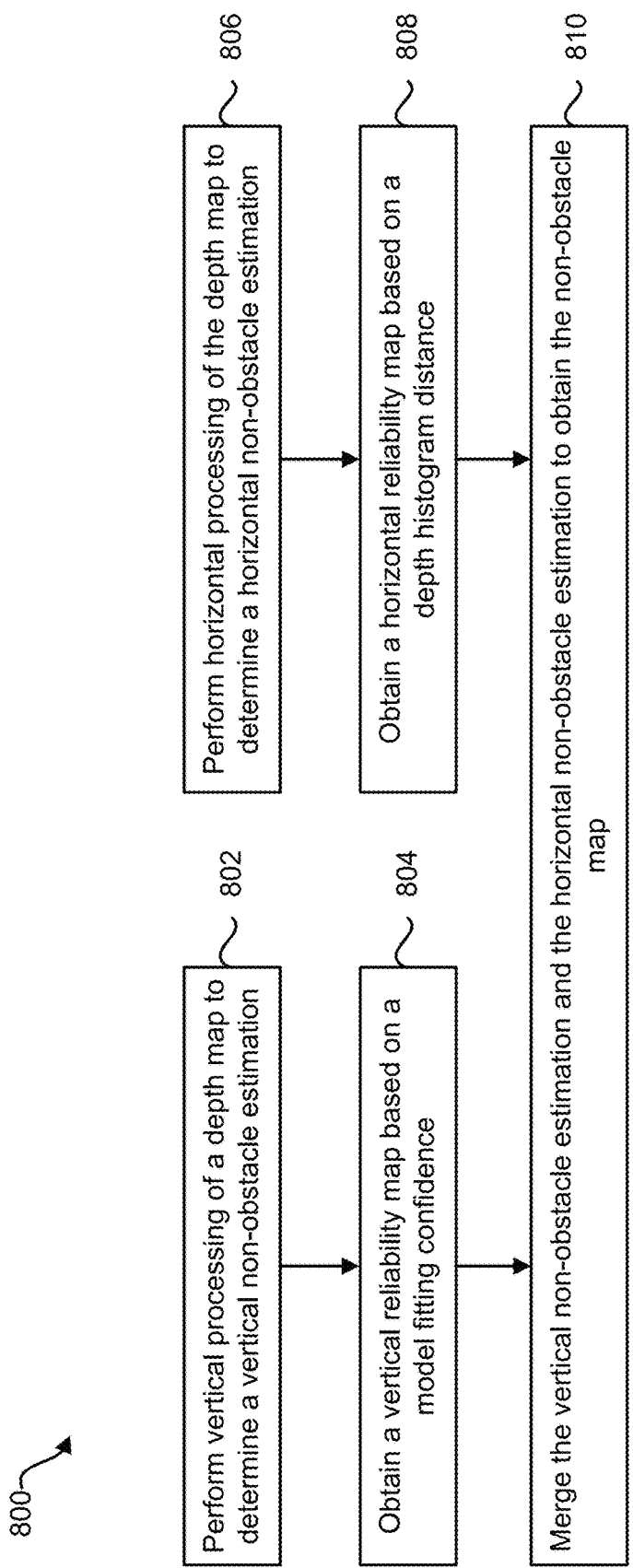
FIG. 8 is a flow diagram illustrating a method for combining a vertical non-obstacle estimation and a horizontal non-obstacle estimation to determine a non-obstacle map.

FIG. 8 is a flow diagram illustrating a method 800 for combining a vertical non-obstacle estimation 242 and a horizontal non-obstacle estimation 258 to determine a non-obstacle map 226. The method 800 may be implemented by an electronic device 102, e.g., a non-obstacle determination module 116. In this method 800, the electronic device 102 may perform vertical processing and horizontal processing in parallel.

The electronic device 102 may perform 802 vertical processing of a depth map 230 to determine a vertical non-obstacle estimation 242. This may be accomplished as described in connection with FIG. 5.

The electronic device 102 may obtain 804 a vertical reliability map 248 based on a model fitting confidence. This may be accomplished as described in connection with FIG. 5.

The electronic device 102 may perform 806 horizontal processing of the depth map 230 to determine a horizontal non-obstacle estimation 258. This may be accomplished as described in connection with FIG. 7.

The electronic device 102 may obtain 808 a horizontal reliability map 262 based on a depth histogram 252 distance. This may be accomplished as described in connection with FIG. 7.

It should be noted that steps 802, 804, 806, 808 may be performed in parallel. For example, while the electronic device 102 performs the vertical processing steps 802 and 804, the electronic device 102 may simultaneously perform the horizontal processing steps 806 and 808.

The electronic device 102 may merge 810 the vertical non-obstacle estimation 242 and the horizontal non-obstacle estimation 258 to obtain the non-obstacle map 226. This merge may be based on the vertical reliability map 248 and the horizontal reliability map 262.

If both the vertical reliability map 248 and the horizontal reliability map 262 indicate that a pixel 232 has a high reliability, then the pixel 232 may be identified as a non-obstacle area 266 in the non-obstacle map 226. For example, if the vertical reliability map 248 indicates a high vertical reliability value 250 and the horizontal reliability map 262 indicates a high horizontal reliability value 264, then the pixel 232 may be labeled as a non-obstacle area 266 in the non-obstacle map 226.

For the case where either of the vertical reliability map 248 or the horizontal reliability map 262 indicates a high reliability and the other indicates a low reliability, one or more different merging approaches may be performed. In one approach, if at least one of the vertical reliability map 248 or the horizontal reliability map 262 indicates that the given pixel 232 has a low reliability value 250, 264, then the given pixel 232 is identified as an obstacle area 268 in the non-obstacle map 226. In another approach, the vertical reliability map 248 and the horizontal reliability map 262 may indicate different reliability values 250, 264. In this case, the given pixel 2332 may be identified as a non-obstacle area 266 or obstacle area 268 based on the coordinate of the given pixel 232.

Figure 9:
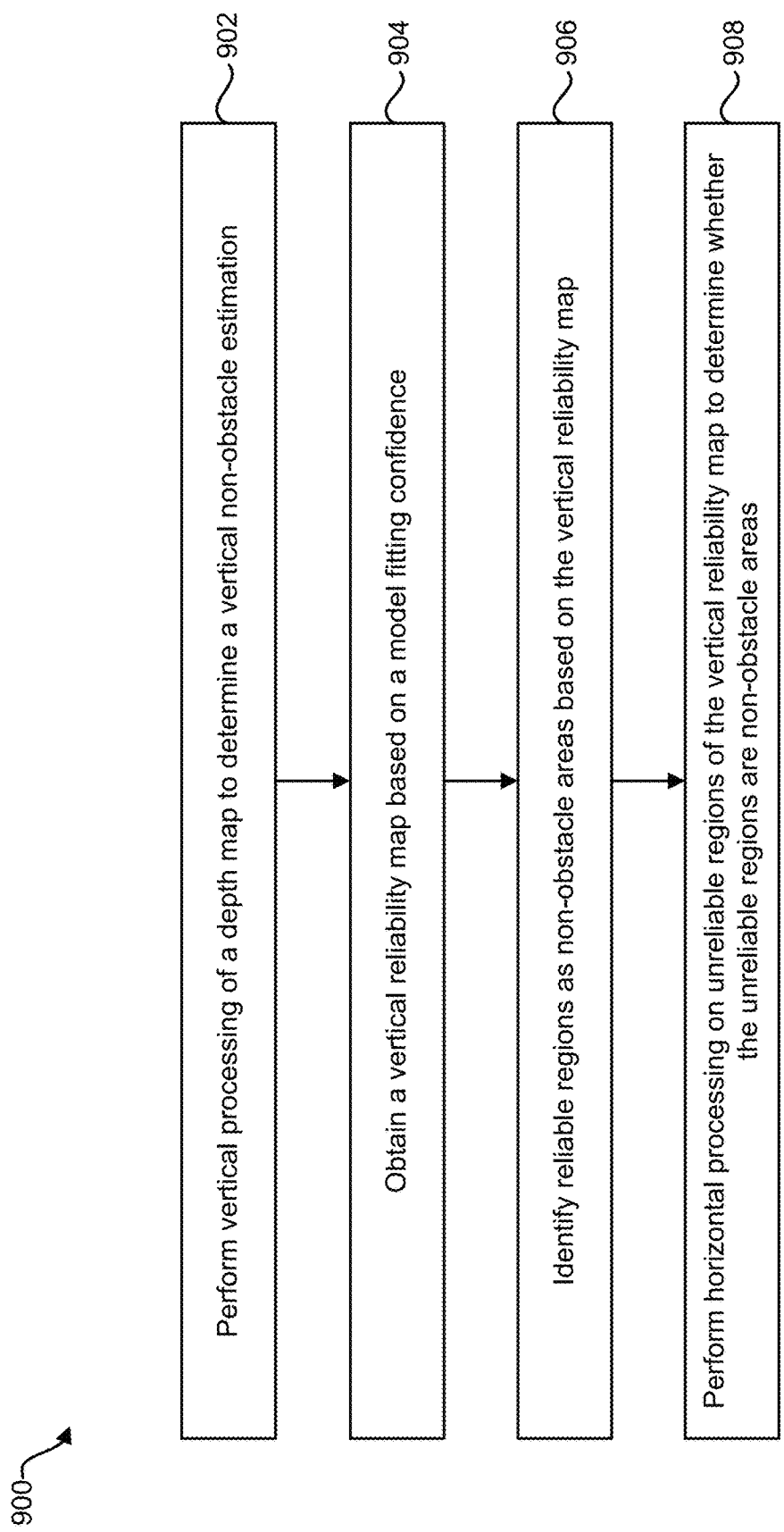
FIG. 9 is a flow diagram illustrating another method for combining a vertical non-obstacle estimation and a horizontal non-obstacle estimation to determine a non-obstacle map.

FIG. 9 is a flow diagram illustrating another method 900 for combining a vertical non-obstacle estimation 242 and a horizontal non-obstacle estimation 258 to determine a non-obstacle map 226. The method 900 may be implemented by an electronic device 102, e.g., a non-obstacle determination module 116. In this method 900, the electronic device 102 may perform a sequential application of vertical processing followed by horizontal processing.

The electronic device 102 may perform 902 vertical processing of a depth map 230 to determine a vertical non-obstacle estimation 242. This may be accomplished as described in connection with FIG. 5.

The electronic device 102 may obtain 904 a vertical reliability map 248 based on a model fitting confidence. This may be accomplished as described in connection with FIG. 5.

The electronic device 102 may identify 906 reliable regions as non-obstacle areas 266 based on the vertical reliability map 248. For example, each pixel 232 that has a high vertical reliability value 250 in the vertical reliability map 248 may be labeled as a non-obstacle area 266 in the non-obstacle map 226.

The electronic device 102 may perform 908 horizontal processing on unreliable regions of the vertical reliability map 248 to determine whether the unreliable regions are non-obstacle areas 266. For example, the electronic device 102 may perform horizontal processing on at least one row of pixels 232 that have a low reliability value 250. It should be noted that the length of a row could be as wide as the image 114 or could be shorter than the image width. The horizontal processing may be accomplished as described in connection with FIG. 7 to determine a horizontal non-obstacle estimation 258. The non-obstacle map 226 may be updated based on the results of the horizontal reliability map 262 of the unreliable regions.

Figure 10:
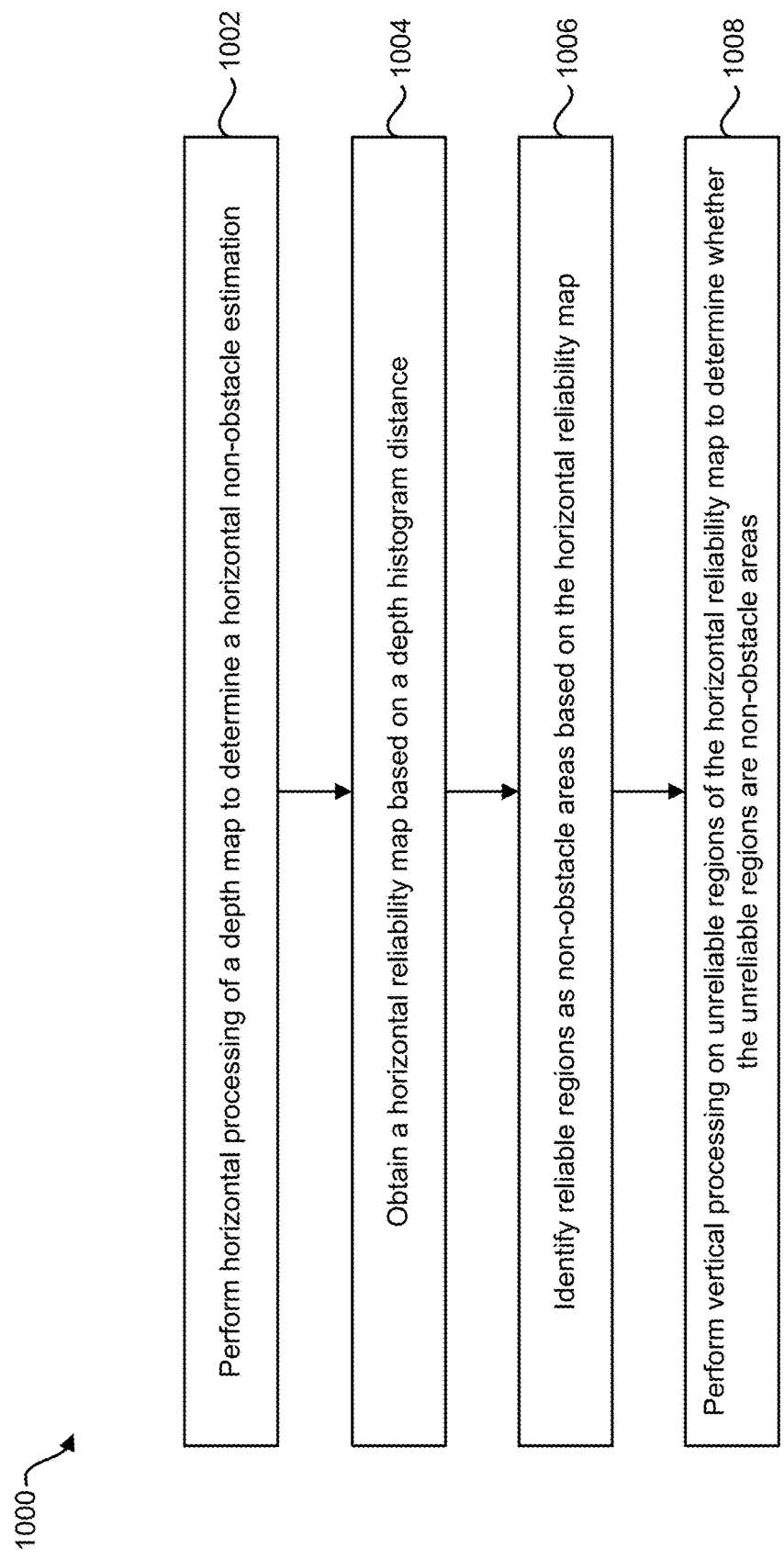
FIG. 10 is a flow diagram illustrating yet another method for combining a vertical non-obstacle estimation and a horizontal non-obstacle estimation to determine a non-obstacle map.

FIG. 10 is a flow diagram illustrating yet another method 1000 for combining a vertical non-obstacle estimation 242 and a horizontal non-obstacle estimation 258 to determine a non-obstacle map 226. The method 1000 may be implemented by an electronic device 102, e.g., a non-obstacle determination module 116. In this method 1000, the electronic device 102 may perform a sequential application of horizontal processing followed by vertical processing.

The electronic device 102 may perform 1002 horizontal processing of a depth map 230 to determine a horizontal non-obstacle estimation 258. This may be accomplished as described in connection with FIG. 7.

The electronic device 102 may obtain 1004 a horizontal reliability map 262 based on a depth histogram 252 distance. This may be accomplished as described in connection with FIG. 7.

The electronic device 102 may identify 1006 reliable regions as non-obstacle areas 266 based on the horizontal reliability map 262. For example, each pixel 232 that has a high horizontal reliability value 264 in the horizontal reliability map 262 may be labeled as a non-obstacle area 266 in the non-obstacle map 226.

The electronic device 102 may perform 1008 vertical processing on unreliable regions of the horizontal reliability map 262 to determine whether the unreliable regions are non-obstacle areas 266. For example, the electronic device 102 may perform vertical processing on one or more column (s) of pixels 232 that have a low horizontal reliability value 264. The one or more column(s) of pixels 232 may be as tall as the image 114 or could be less than the image height.

The vertical processing may be accomplished as described in connection with FIG. 5 to determine a vertical non-obstacle estimation 242. The non-obstacle map 226 may be updated based on the results of the vertical reliability map 248 of the unreliable regions.

FIGS. 11A-11B illustrate an example of determining non-obstacle areas 1166 in an image 1114. In this example, the original image 1114a is an image of a one-way road.

The processed image 1114b shows the non-obstacle area 1166 that is determined according to the systems and methods described herein. The processed image 1114b shows an example from an intermediate step of the algorithm, not the final result. This is to show there could be holes in the non-obstacle map 126 that should be further processed. Also this illustrates the result from vertical processing alone.

The non-obstacle area 1166 includes the open area corresponding to the road. Certain outlier areas 1178 in non-obstacle area 1166 were not identified as part of the non-obstacle area 1166. As used herein, outlier means that the depth values in the image 1114b did not fit in the predetermined model. This may be due to a possible wrong estimation of depth values (e.g., input depth values may not be perfect), so some areas appear as holes (or outliers). These outlier areas 1178 may be removed by performing additional processing of the image 1114.

FIGS. 12A-12B illustrate another example of determining non-obstacle areas 1266 in an image 1214. In this example, the original image 1214a is an image of an intersection. The processed image 1214b shows the non-obstacle area 1266 that is determined according to the systems and methods described herein.

Figure 13A:
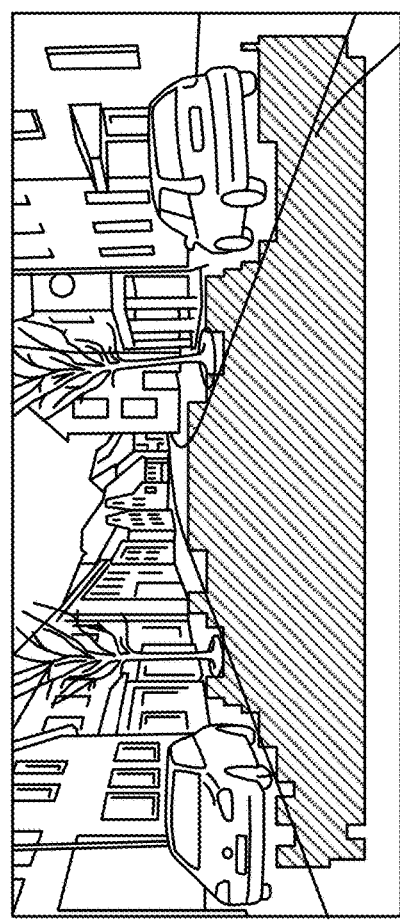
FIGS. 13A-13B illustrate an example of determining distance from a non-obstacle area.
Figure 13B:
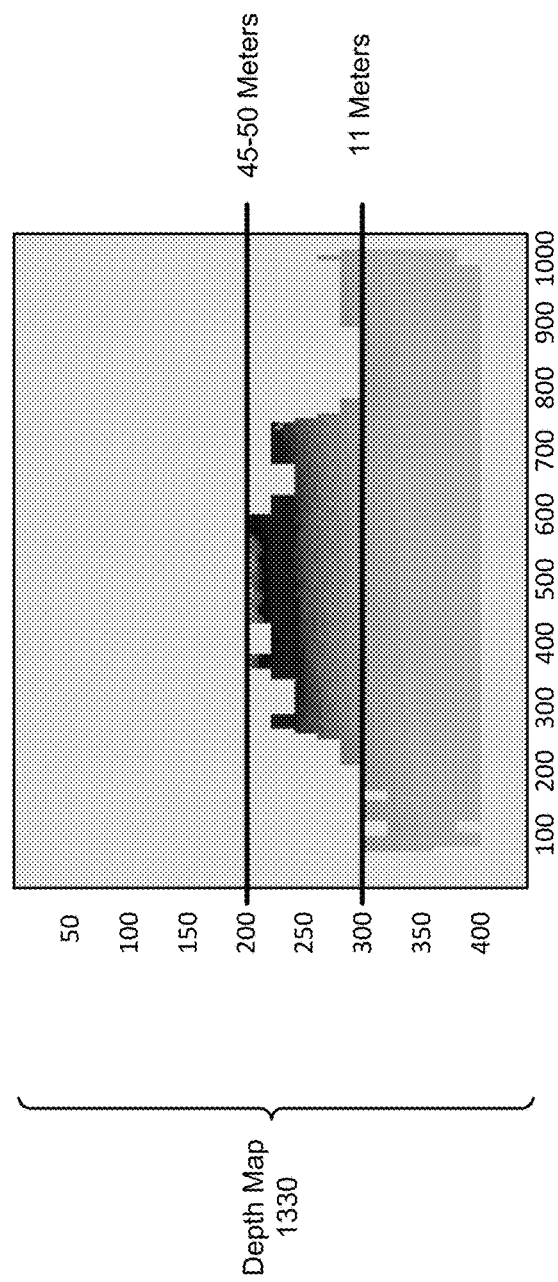

FIGS. 13A-13B illustrate an example of determining distance 1380 from a non-obstacle area 1366. This example shows the processed image 1314 of the road described in connection with FIGS. 11A-11B. The non-obstacle area 1366 is determined according to the systems and methods described herein.

In the depth map 1330 of FIG. 13B, the x and y coordinates are the coordinate positions and the shading is indicative of depth. In this example, the depth map 1330 includes the depth information for the non-obstacle area 1366. The depth map 1330 indicates how far there will be free space in front of the camera.

Using the depth values 234 from the depth map 1330, the electronic device 102 may determine various distances associated with the non-obstacle area 1366b. For example, the electronic device 102 may determine that the farthest distance in the non-obstacle area 1366b is between 45-50 meters away from the image sensor 104. Similarly, the electronic device 102 may determine that the nearest cars are approximately 11 meters from the image sensor 104.

Figure 14:
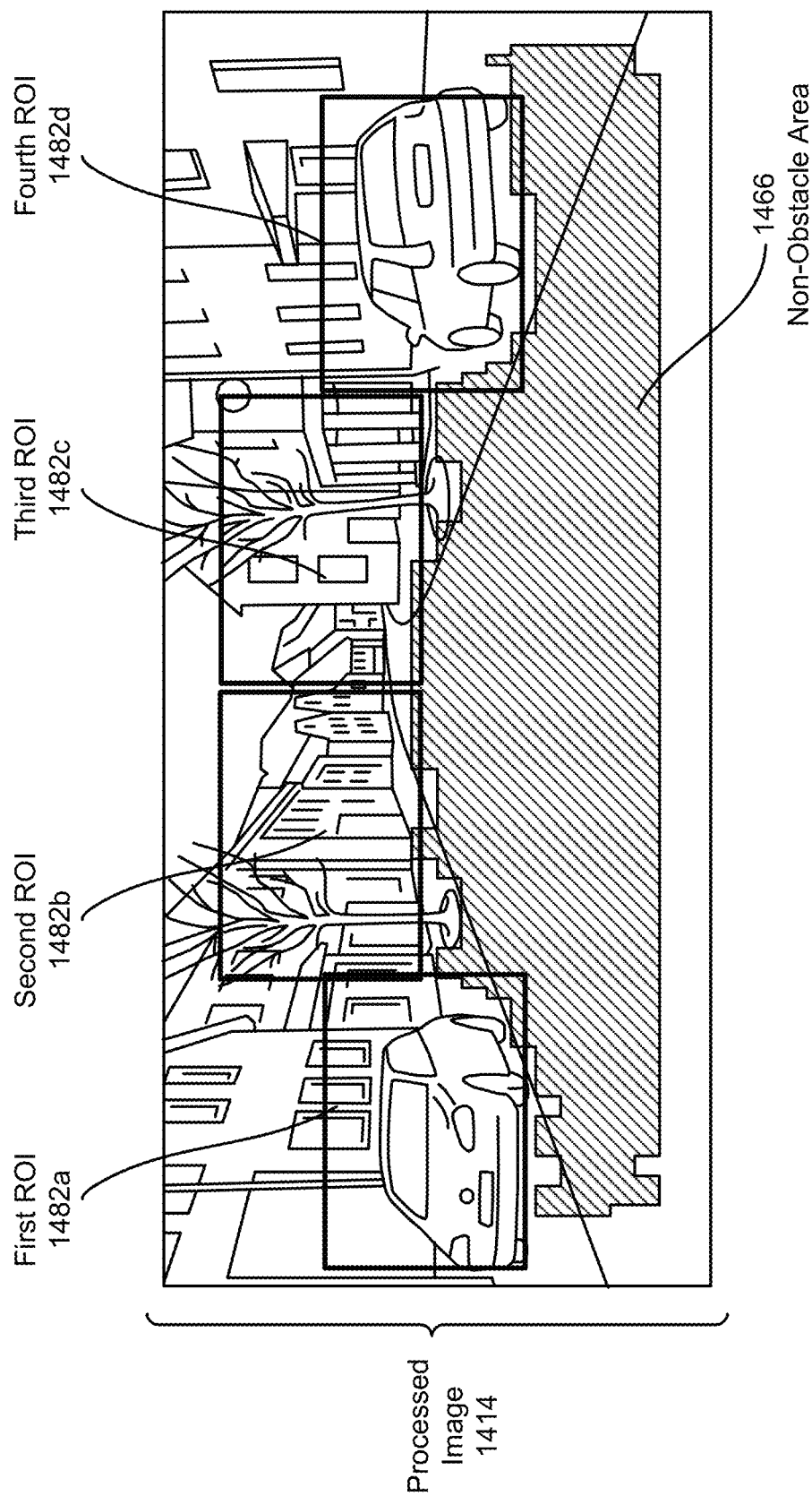
FIG. 14 illustrates an example of using the non-obstacle map to identify a region of interest (ROI) used by an object detection algorithm.

FIG. 14 illustrates an example of using the non-obstacle map 226 to identify a region of interest (ROI) 1482 used by an object detection algorithm. This example shows the processed image 1414 of the road described in connection with FIGS. 11A-11B. The non-obstacle area 1466 is determined according to the systems and methods described herein.

The electronic device 102 may then identify one or more ROI 1482 for a potential obstacle area 268. For example, the electronic device 102 may identify obstacle areas 268 from the non-obstacle map 226. In an implementation, pixels 232 that are not labeled as non-obstacle area 1466 may be identified as an obstacle area 268. These obstacle areas 268 may be included in one or more ROIs 1482. In this example, the electronic device 102 identifies four ROIs 1482*a-d* as potential object areas.

The electronic device 102 may run an object detector in the identified ROIs 1482. For example, the electronic device 102 may detect whether an ROI 1482 includes a car, traffic signal, a pedestrian, lanes, curbs, etc.

Identifying the non-obstacle area 1466 first results in a reduced search area for the object detection. This may reduce the amount of processing that is performed for object detection.

Figure 15:
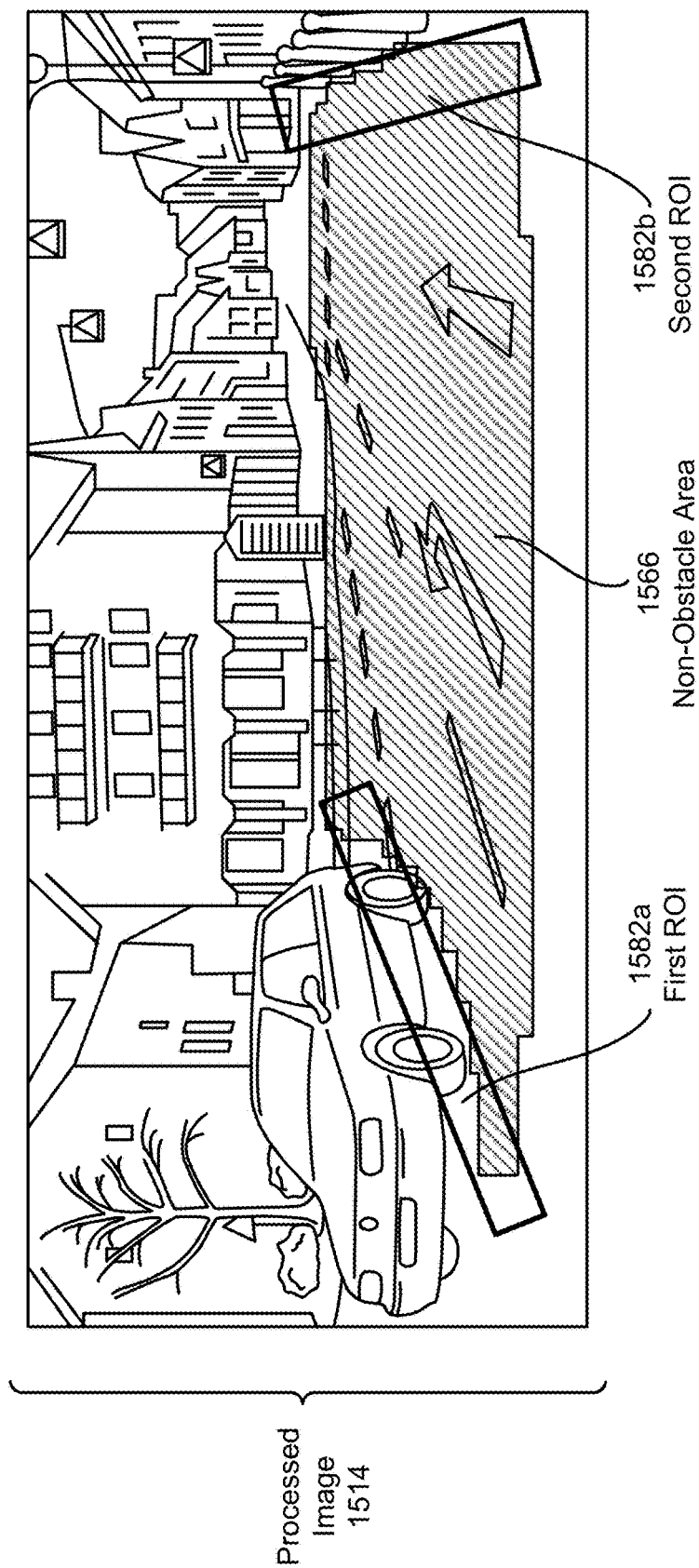
FIG. 15 illustrates an example of using the non-obstacle map to identify a ROI used by a lane detection algorithm.

FIG. 15 illustrates an example of using the non-obstacle map 226 to identify a region of interest (ROI) 1582 used by a lane detection algorithm. This example shows the processed image 1514 of a road. The non-obstacle area 1566 is determined according to the systems and methods described herein.

The electronic device 102 may then identify one or more ROI 1582 for road sides and/or curbs. For example, the electronic device 102 may identify obstacle areas 268 from the non-obstacle map 226. In this example, the electronic device 102 identifies two ROIs 1582*a-b* on the sides of the non-obstacle area 1566 as potential road sides and/or curbs.

The electronic device 102 may run a lane detector in the identified ROIs 1582*a-b*. Identifying the non-obstacle area 1566 first results in a reduced search area for the lane detection. This may reduce the amount of processing that is performed for lane detection.

Figure 16:
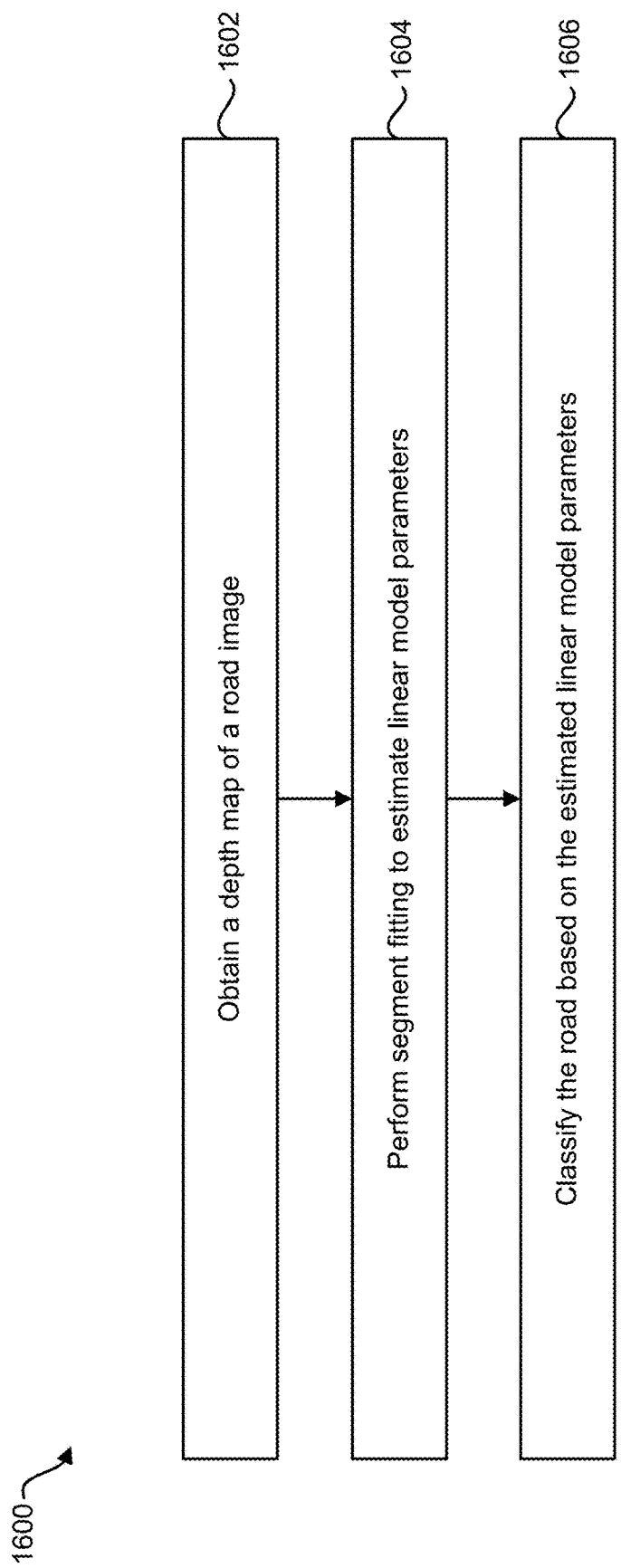
FIG. 16 is a flow diagram illustrating a method for classifying a road based on estimated linear model parameters.

FIG. 16 is a flow diagram illustrating a method 1600 for classifying a road based on estimated linear model parameters 238. The method 1600 may be implemented by an electronic device 102, e.g., a non-obstacle determination module 116.

The electronic device 102 may obtain 1602 a depth map 230 of a road image 114. The depth map 230 may be generated as described in connection with FIG. 2.

The electronic device 102 may perform 1604 segment fitting to estimate linear model parameters 238. The estimated linear model parameters 238 may be determined as described in connection with FIG. 2.

The electronic device 102 may classify 1606 the road based on the estimated linear model parameters 238. For example, the electronic device 102 may compare the estimated linear model parameters 238 with a plurality of pre-determined linear model parameters 240. As described above, the pre-determined linear model parameters 240 may be associated with a plurality of road condition models. Each of the plurality of road condition models may have a corresponding set of linear model parameters 240. Examples of the road condition models include a flat plane, slope (e.g., hill), valley, irregular road, etc.

In an implementation, the pre-determined linear model parameters 240 can be obtained via training. Pre-labeled test data can be used, where pre-labeled refers to labeled images 114 and depth maps 230 of flat roads, or irregular roads, etc. With this data the pre-determined linear model parameters 240 may be generated.

The electronic device 102 may determine which of the pre-determined linear model parameters 240 best fit the estimated linear model parameters 238. The road may be classified 1606 according to the road condition model that best fits the estimated linear model parameters 238. Therefore, by classifying 1606 the road, the electronic device 102 may determine the type of free space in the road image 114.

Figure 17:
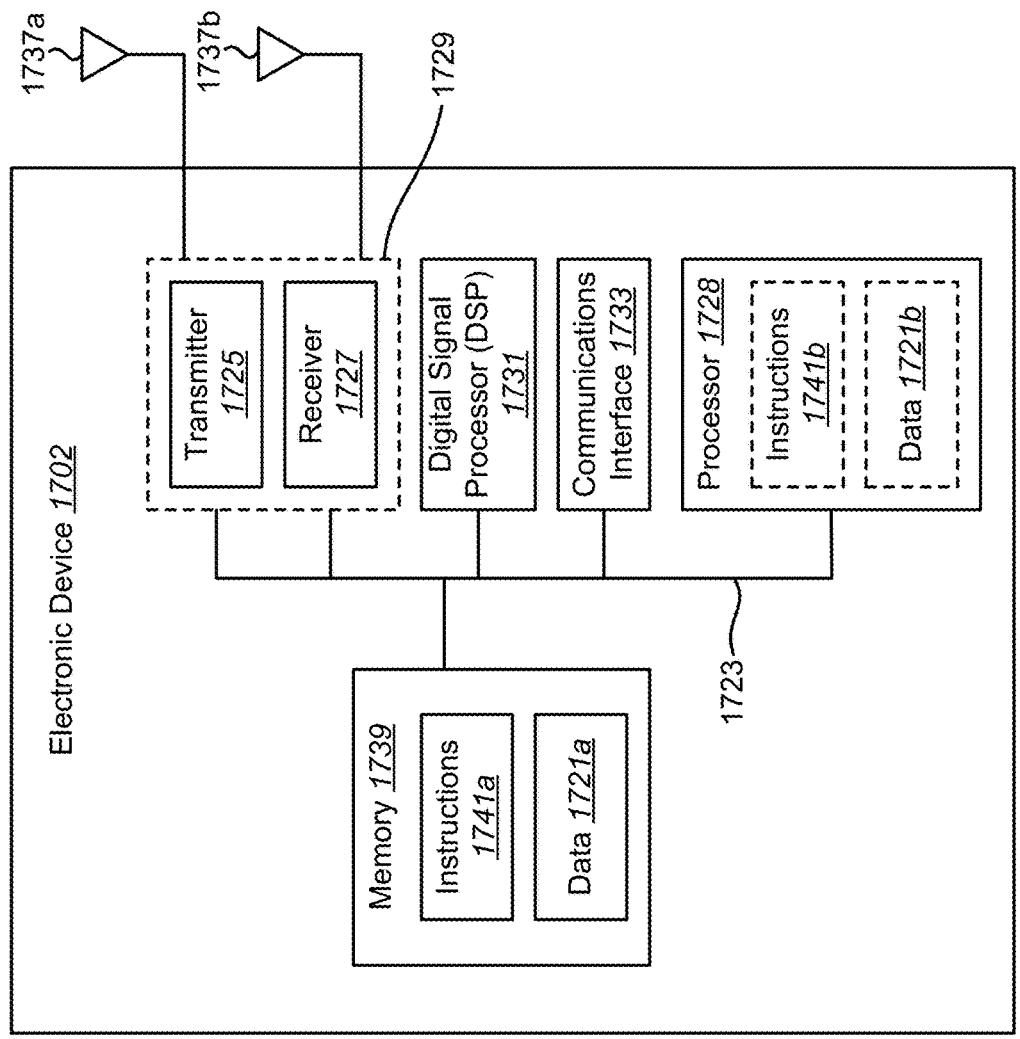
FIG. 17 illustrates certain components that may be included within an electronic device.

FIG. 17 illustrates certain components that may be included within an electronic device 1702. The electronic device 1702 may be or may be included within a camera, video camcorder, digital camera, cellular phone, smart phone, computer (e.g., desktop computer, laptop computer, etc.), tablet device, media player, television, automobile, personal camera, action camera, surveillance camera, mounted camera, connected camera, robot, aircraft, drone, unmanned aerial vehicle (UAV), healthcare equipment, gaming console, personal digital assistants (PDA), set-top box, etc. The electronic device 1702 includes a processor 1728. The processor 1728 may be a general purpose single- or multi-chip microprocessor (e.g., an ARM), a special purpose microprocessor (e.g., a digital signal processor (DSP)), a microcontroller, a programmable gate array, etc. The processor 1728 may be referred to as a central processing unit (CPU). Although just a single processor 1728 is shown in the electronic device 1702, in an alternative configuration, a combination of processors (e.g., an ARM and DSP) could be used.

The electronic device 1702 also includes memory 1739. The memory 1739 may be any electronic component capable of storing electronic information. The memory 1739 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1721*a* and instructions 1741*a* may be stored in the memory 1739. The instructions 1741*a* may be executable by the processor 1728 to implement one or more of the methods described herein. Executing the instructions 1741*a* may involve the use of the data that is stored in the memory 1739. When the processor 1728 executes the instructions 1741, various portions of the instructions 1741*b* may be loaded onto the processor 1728, and various pieces of data 1721*b* may be loaded onto the processor 1728.

The electronic device 1702 may also include a transmitter 1725 and a receiver 1727 to allow transmission and reception of signals to and from the electronic device 1702. The transmitter 1725 and receiver 1727 may be collectively referred to as a transceiver 1729. One or multiple antennas 1737*a-b* may be electrically coupled to the transceiver 1729. The electronic device 1702 may also include (not shown) multiple transmitters, multiple receivers, multiple transceivers and/or additional antennas.

The electronic device 1702 may include a digital signal processor (DSP) 1731. The electronic device 1702 may also include a communications interface 1733. The communications interface 1733 may allow enable one or more kinds of input and/or output. For example, the communications interface 1733 may include one or more ports and/or communication devices for linking other devices to the electronic device 1702. Additionally or alternatively, the communications interface 1733 may include one or more other interfaces (e.g., touchscreen, keypad, keyboard, microphone, camera, etc.). For example, the communication interface 1733 may enable a user to interact with the electronic device 1702.

The various components of the electronic device 1702 may be coupled together by one or more buses, which may include a power bus, a control signal bus, a status signal bus, a data bus, etc. For the sake of clarity, the various buses are illustrated in FIG. 17 as a bus system 1723.

In accordance with the present disclosure, a circuit, in an electronic device, may be adapted to obtain a depth map from one or more images. Each pixel in the depth map may have a depth value. The same circuit, a different circuit, or a second section of the same or different circuit may be adapted to perform vertical processing of the depth map to determine a vertical non-obstacle estimation. The same circuit, a different circuit, or a third section of the same or different circuit may be adapted to perform horizontal processing of the depth map to determine a horizontal non-obstacle estimation. The same circuit, a different circuit, or a fourth section of the same or different circuit may be adapted to combine the vertical non-obstacle estimation and the horizontal non-obstacle estimation to determine a non-obstacle map. In addition, the same circuit, a different circuit, or a fifth section of the same or different circuit may be adapted to control the configuration of the circuit(s) or section(s) of circuit(s) that provide the functionality described above.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method performed by an electronic device, comprising:
generating a depth map of a scene external to a vehicle;
performing first processing in a first direction of the depth map to determine a first non-obstacle estimation of the scene;
performing second processing in a second direction of the depth map to determine a second non-obstacle estimation of the scene;
combining the first non-obstacle estimation and the second non-obstacle estimation to determine a non-obstacle map of the scene, wherein the combining comprises selectively using at least one element selected from the group consisting of a first reliability map of the first processing and a second reliability map of the second processing; and
navigating the vehicle using the non-obstacle map.

2. The method of claim 1, wherein navigating the vehicle comprises providing at least the non-obstacle map as input to an advanced driver assistance systems (ADAS) to regulate at least one of speed or steering of the vehicle.

3. The method of claim 1, wherein the navigating comprises using the non-obstacle map to identify a region of interest that is used by at least one of an object detection algorithm or a lane detection algorithm.

4. The method of claim 1, wherein the vehicle is an autonomous automobile or aerial drone, wherein the navigating comprises navigating the autonomous automobile or aerial drone without human input using the non-obstacle map.

5. The method of claim 1, further comprising generating the depth map using a stereo image pair that is captured by two cameras attached to the vehicle.

6. The method of claim 1, further comprising generating the depth map using a sequence of video images that are captured by a camera attached to the vehicle.

7. The method of claim 1, wherein combining the first non-obstacle estimation and the second non-obstacle estimation further comprises:
performing both the first processing and the second processing in parallel; and
merging the first non-obstacle estimation and the second non-obstacle estimation based on the first reliability map and the second reliability map, wherein a given pixel is identified as a non-obstacle area in the non-obstacle map by comparing a reliability value for the given pixel in the first reliability map and the second reliability map.

8. The method of claim 1, wherein combining the first non-obstacle estimation and the second non-obstacle estimation comprises:
performing first processing of the depth map;
obtaining the first reliability map that includes a reliability value for a plurality of pixels in the first reliability map;
determining reliable regions that include pixels of the first reliability map that have reliability values greater than a threshold;
determining unreliable regions that include pixels of the first reliability map that do not have reliability values greater than the threshold;
identifying the reliable regions of the first reliability map as non-obstacle areas; and
performing second processing on the unreliable regions of the first reliability map to determine whether the unreliable regions are non-obstacle areas.

9. The method of claim 1, further comprising determining the first reliability map, comprising:
determining a segment fitting error for a given segment of pixels in the depth map based on a difference between estimated linear model parameters for the given segment and pre-determined linear model parameters, wherein the pre-determined linear model parameters are selected from among a plurality of road condition models, wherein each of the road condition models has a corresponding set of linear model parameters;
determining a reliability value for the given segment by comparing the segment fitting error to a first estimation threshold; and
applying the reliability value for the given segment to at least one pixel in the given segment.

10. The method of claim 1, further comprising determining the second reliability map, comprising:
determining whether the depth value of a given pixel in the depth map is within a range of a mode of the depth histogram, wherein the given pixel has a high reliability value when the depth value of the given pixel is within the range of the mode of the depth histogram.

11. An electronic device, comprising:
at least one processor;
a memory in communication with the at least one processor; and
instructions stored in the memory, the instructions executable by the at least one processor to:
generate a depth map of a scene external to a vehicle;
perform first processing in a first direction of the depth map to determine a first non-obstacle estimation of the scene;
perform second processing in a second direction of the depth map to determine a second non-obstacle estimation of the scene;
combine the first non-obstacle estimation and the second non-obstacle estimation to determine a non-obstacle map of the scene, wherein the combining comprises selectively using at least one element selected from the group consisting of a first reliability map of the first processing and a second reliability map of the second processing; and
navigate the vehicle using the non-obstacle map.

12. The electronic device of claim 11, wherein the instructions executable by the at least one processor to navigate the vehicle comprise instructions executable by the at least one processor to provide at least the non-obstacle map as input to an advanced driver assistance systems (ADAS) to regulate at least one of speed or steering of the vehicle.

13. The electronic device of claim 11, wherein the instructions executable by the at least one processor to navigate the vehicle comprise instructions executable by the at least one processor to use the non-obstacle map to identify a region of interest that is used by at least one of an object detection algorithm or a lane detection algorithm.

14. The electronic device of claim 11, wherein the vehicle is an autonomous automobile or aerial drone, wherein the instructions executable by the at least one processor to navigate the vehicle comprise instructions executable by the at least one processor to navigate the autonomous automobile or aerial drone without human input using the non-obstacle map.

15. The electronic device of claim 11, further comprising a first camera and a second camera, wherein the first and second cameras are attached to the vehicle and in communication with the at least one processor, and wherein the instructions executable by the at least one processor to generate the depth map comprise instructions executable by the at least one processor to generate the depth map using a stereo image pair captured by the first and second cameras.

16. The electronic device of claim 11, further comprising at least one camera attached to the vehicle and in communication with the at least one processor, and wherein the instructions executable by the at least one processor to generate the depth map comprise instructions executable by the at least one processor to generate the depth map using a sequence of video images captured by the at least one camera.

17. The electronic device of claim 11, wherein the instructions executable by the at least one processor to combine the first non-obstacle estimation and the second non-obstacle estimation further comprises instructions executable by the at least one processor to:
perform both the first processing and the second processing in parallel; and
merge the first non-obstacle estimation and the second non-obstacle estimation based on the first reliability map and the second reliability map, wherein a given pixel is identified as a non-obstacle area in the non-obstacle map by comparing a reliability value for the given pixel in the first reliability map and the second reliability map.

18. The electronic device of claim 11, wherein the instructions executable by the at least one processor to combine the first non-obstacle estimation and the second non-obstacle estimation comprises instructions executable by the at least one processor to:
perform first processing of the depth map;
obtain the first reliability map that includes a reliability value for a plurality of pixels in the first reliability map;
determine reliable regions that include pixels of the first reliability map that have reliability values greater than a threshold;
determine unreliable regions that include pixels of the first reliability map that do not have reliability values greater than the threshold;
identify the reliable regions of the first reliability map as non-obstacle areas; and
perform second processing on unreliable regions of the first reliability map to determine whether the unreliable regions are non-obstacle areas.

19. The electronic device of claim 11, further comprising instructions executable by the at least one processor to determine the first reliability map, comprising instructions executable by the at least one processor to:
determine a segment fitting error for a given segment of pixels in the depth map based on a difference between estimated linear model parameters for the given segment and pre-determined linear model parameters, wherein the pre-determined linear model parameters are selected from among a plurality of road condition models, wherein each of the road condition models has a corresponding set of linear model parameters;
determine a reliability value for the given segment by comparing the segment fitting error to a first estimation threshold; and
apply the reliability value for the given segment to at least one pixel in the given segment.

20. The electronic device of claim 11, further comprising instructions executable by the at least one processor to determine the second reliability map, comprising instructions executable by the at least one processor to:
determine whether the depth value of a given pixel in the depth map is within a range of a mode of the depth histogram, wherein the given pixel has a high reliability value when the depth value of the given pixel is within the range of the mode of the depth histogram.

21. A computer-program product, comprising a non-transitory tangible computer-readable medium having instructions thereon, the instructions comprising:
code for causing an electronic device to generate a depth map of a scene external to a vehicle;
code for causing the electronic device to perform first processing in a first direction of the depth map to determine a first non-obstacle estimation of the scene;
code for causing the electronic device to perform second processing in a second direction of the depth map to determine a second non-obstacle estimation of the scene;
code for causing the electronic device to combine the first non-obstacle estimation and the second non-obstacle estimation to determine a non-obstacle map of the scene, wherein the combining comprises selectively using at least one element selected from the group consisting of a first reliability map of the first processing and a second reliability map of the second processing; and
code for causing the electronic device to navigate the vehicle using the non-obstacle map.

22. The computer-program product of claim 21, wherein the code for causing the electronic device to navigate the vehicle comprises code for causing the electronic device to provide at least the non-obstacle map as input to an advanced driver assistance systems (ADAS) to regulate at least one of speed or steering of the vehicle.

23. The computer-program product of claim 21, wherein the code for causing the electronic device to navigate comprises code for causing the electronic device to use the non-obstacle map to identify a region of interest that is used by at least one of an object detection algorithm or a lane detection algorithm.

24. The computer-program product of claim 21, wherein the vehicle is an autonomous automobile or aerial drone, wherein the code for causing the electronic device to navigate comprises code for causing the electronic device to navigate the autonomous automobile or aerial drone without human input using the non-obstacle map.

25. The computer-program product of claim 21, further comprising code for causing the electronic device to generate the depth map using a stereo image pair that is captured by two cameras attached to the vehicle.

26. The computer-program product of claim 21, further comprising code for causing the electronic device to generate the depth map using a sequence of video images that are captured by a camera attached to the vehicle.

27. The computer-program product of claim 21, wherein the code for causing the electronic device to combine the first non-obstacle estimation and the second non-obstacle estimation further comprises code for causing the electronic device to:
perform both the first processing and the second processing in parallel; and
merge the first non-obstacle estimation and the second non-obstacle estimation based on the first reliability map and the second reliability map, wherein a given pixel is identified as a non-obstacle area in the non-obstacle map by comparing a reliability value for the given pixel in the first reliability map and the second reliability map.

28. The computer-program product of claim 21, wherein the code for causing the electronic device to combine the first non-obstacle estimation and the second non-obstacle estimation comprises code for causing the electronic device to:
- perform first processing of the depth map;
- obtain the first reliability map that includes a reliability value for a plurality of pixels in the first reliability map;
- determine reliable regions that include pixels of the first reliability map that have reliability values greater than a threshold;
- determine unreliable regions that include pixels of the first reliability map that do not have reliability values greater than the threshold;
- identify the reliable regions of the first reliability map as non-obstacle areas; and
- perform second processing on unreliable regions of the first reliability map to determine whether the unreliable regions are non-obstacle areas.

29. The computer-program product of claim 21, further comprising code for causing the electronic device to determining the first reliability map, comprising code for causing the electronic device to:
- determine a segment fitting error for a given segment of pixels in the depth map based on a difference between estimated linear model parameters for the given segment and pre-determined linear model parameters, wherein the pre-determined linear model parameters are selected from among a plurality of road condition models, wherein each of the road condition models has a corresponding set of linear model parameters;
- determine a reliability value for the given segment by comparing the segment fitting error to a first estimation threshold; and
- apply the reliability value for the given segment to at least one pixel in the given segment.

30. The computer-program product of claim 21, further comprising code for causing the electronic device to determine the second reliability map, comprising code for causing the electronic device to:
- determine whether the depth value of a given pixel in the depth map is within a range of a mode of the depth histogram, wherein the given pixel has a high reliability value when the depth value of the given pixel is within the range of the mode of the depth histogram.

* * * * *